US009813910B2

(12) United States Patent
Cheng et al.

(10) Patent No.: US 9,813,910 B2
(45) Date of Patent: Nov. 7, 2017

(54) PREVENTION OF REPLAY ATTACK IN LONG TERM EVOLUTION DEVICE-TO-DEVICE DISCOVERY

(71) Applicant: QUALCOMM Incorporated, San Diego, CA (US)

(72) Inventors: Hong Cheng, Bridgewater, NJ (US); Sudhir Kumar Baghel, Bridgewater, NJ (US); Adrian Edward Escott, Reading (GB)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/609,003

(22) Filed: Jan. 29, 2015

(65) Prior Publication Data

US 2015/0271675 A1    Sep. 24, 2015

Related U.S. Application Data

(60) Provisional application No. 61/955,601, filed on Mar. 19, 2014.

(51) Int. Cl.
| | |
|---|---|
| *H04M 1/66* | (2006.01) |
| *H04W 12/08* | (2009.01) |
| *H04W 8/00* | (2009.01) |
| *H04W 12/10* | (2009.01) |
| *H04L 29/06* | (2006.01) |

(Continued)

(52) U.S. Cl.
CPC ............ *H04W 12/08* (2013.01); *H04L 63/12* (2013.01); *H04W 8/005* (2013.01); *H04W 12/10* (2013.01); *H04L 63/0846* (2013.01); *H04W 12/12* (2013.01); *H04W 76/023* (2013.01)

(58) Field of Classification Search
CPC ..................................................... H04W 12/08
See application file for complete search history.

(56) References Cited

U.S. PATENT DOCUMENTS

2013/0322413 A1* 12/2013 Pelletier ............ H04W 72/1289
370/336
2014/0056220 A1*  2/2014 Poitau ................. H04W 40/246
370/328

(Continued)

FOREIGN PATENT DOCUMENTS

WO    WO-0163954 A1    8/2001
WO    WO-2014037277 A1    3/2014

OTHER PUBLICATIONS

ISA/EPO, International Search Report and the Written Opinion of the International Searching Authority, Int'l App. No. PCT/US2015/013804, dated Apr. 10, 2015, European Patent Office, Rijswijk, NL, 9 pgs.

*Primary Examiner* — Idowu O Osifade
(74) *Attorney, Agent, or Firm* — Holland & Hart LLP

(57) ABSTRACT

Methods, systems, and devices are described for device-to-device (D2D) wireless communication. A device may receive a timing variable from a network while the device is in a connected mode. The device may then use the timing variable for D2D discovery message authentication. The device may compare the timing variable with a local timing variable to determine whether a difference between the two variables is within a maximum allowable offset. The device may announce the D2D discovery message to another device when the difference is within the maximum allowable offset.

30 Claims, 22 Drawing Sheets

(51) Int. Cl.
*H04W 12/12* (2009.01)
*H04W 76/02* (2009.01)

(56) References Cited

U.S. PATENT DOCUMENTS

2015/0029918 A1* 1/2015 Bangolae .............. H04W 76/02
   370/311
2015/0382173 A1* 12/2015 Wang .................... H04W 8/005
   370/329
2016/0261757 A1* 9/2016 Rajadurai ............. H04M 15/61
2016/0295430 A1* 10/2016 Jung .................... H04W 24/04

* cited by examiner

PREVENTION OF REPLAY ATTACK IN LONG TERM EVOLUTION DEVICE-TO-DEVICE DISCOVERY

CROSS REFERENCES

The present application for patent claims priority to U.S. Provisional Patent Application No. 61/955,601 by "Cheng" et al., entitled "Prevention of Replay Attack in Long Term Evolution Device-to-Device Discovery," filed Mar. 19, 2014, and assigned to the assignee hereof.

BACKGROUND

Field of the Disclosure

The present disclosure, for example, relates to wireless communication systems, and more particularly to prevention of replay attack in long term evolution device-to-device discovery.

Description of the Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems. Generally, a wireless multiple-access communications system may include a number of base stations, each simultaneously supporting communication for multiple user devices. Base stations may communicate with devices on downstream and upstream links. Each base station has a coverage range, which may be referred to as the coverage area of the base station or cell.

Devices (i.e., user equipments (UEs)) that are proximate to each other may also communicate directly via device-to-device (D2D) or proximity based service (ProSe) communication. This direct communication, however, includes potential security vulnerabilities. Specifically, devices participating in D2D discovery communication may be subject to a replay attack by a rogue base station, for example. Therefore, security of devices participating in D2D discovery communications may be enhanced.

SUMMARY

The described features generally relate to one or more improved methods, systems, or apparatuses for managing wireless communications. The improved methods include receiving, at a device, a timing variable while the device is in a connected mode. The timing variable can then be used during device-to-device (D2D) discovery communications to verify the authenticity of D2D discovery messages.

According to a first set of illustrative examples, a method for wireless communication may include receiving a timing variable from a network at a device, where the timing variable is received while the device is in a connected mode. The method may also include using the timing variable for D2D discovery message authentication. The timing variable may also be stored at the device to be compared with a local timing variable. In some examples, the timing variable is received from a proximity based service (ProSe) function in the network. The timing variable may be received with a D2D discovery application code, and may be coordinated universal time (UTC). Additionally, a timing offset allowance may be received from the ProSe function in the network, wherein the method may then include comparing the received timing variable with a local timing variable to determine whether a difference between the received timing variable and the local timing variable is less than the timing offset allowance. The local timing variable may be received via a system information block (SIB). If the difference between the timing variable received from the network and the local timing variable is within the timing offset allowance, the method may include announcing the D2D discovery application code. If the difference is greater than the timing offset allowance, the method may include notifying the ProSe function of anomaly. In some examples, the method may include transitioning to a connected mode with a base station. Or, the method may include making a request to the base station for a timing variable via radio resource control (RRC) messages.

The method may also include synchronizing the timing variable received from the ProSe function with the local timing variable when the difference is less than the timing offset allowance. The ProSe function may be notified of an anomaly when the difference is greater than the timing offset allowance.

The timing variable received from the network may be used to generate a message integrity code (MIC) to be included in a D2D discovery announcement. The MIC may be generated based on a D2D discovery application code, a key associated with the D2D discovery application code, and the local version of the timing variable at the time of transmission of the D2D discovery announcement. Alternatively, the method may include receiving a D2D discovery announcement including a MIC, and transmitting the received MIC and the timing variable to a ProSe function in the network.

In certain examples, the method may further include receiving authorization to participate in D2D discovery while the device is in the connected mode and detecting the SIB while the device is in the connected mode. The timing variable may be received via a system information block (SIB). The SIB may be dedicated to D2D discovery information. The method may also include ignoring the timing variable received in the SIB if the device detects more than one SIB having timing information, and obtaining the timing variable outside of the SIB. Additionally, the method may include comparing the timing variable received in the SIB with a local timing variable. If the received timing variable and the local timing variable differ by more than a predetermined threshold, the method may include obtaining the timing variable outside of the SIB.

In certain examples, the method may include receiving an SIB for timing variable synchronization via a radio resource control (RRC) message while the device is in the connected mode. The method may also include requesting D2D discovery resources via an RRC message when the device is using a network controlled D2D discovery resource allocation scheme, wherein the timing variable is received via a response to the RRC message. Alternatively, the method may include requesting D2D discovery resources via an RRC message when the device is using a device controlled D2D discovery resource allocation scheme, and receiving a response to the RRC message that includes the timing variable and an empty resource allocation element.

Other examples include forwarding the received timing variable to another device. The timing variable may be UTC.

Alternatively, the timing variable may be a counter that increments with D2D discovery periods.

According to a second set of illustrative examples, an apparatus for wireless communication may include means for receiving a timing variable from a network at a device, the timing variable being received while the device is in a connected mode, as well as means for using the timing variable for D2D discovery message authentication. The timing variable may be received from a ProSe function in the network. The timing variable may also be received with a D2D discovery application code, and may be UTC. The apparatus may further include means for receiving a timing offset allowance from the ProSe function in the network and means for comparing the timing variable received from the network with a local timing variable to determine whether a difference between the received timing variable and the local timing variable is less than the timing offset allowance. The apparatus may also include means for announcing the D2D discovery application code if the difference between the timing variable received from the network and the local timing variable is within the timing offset allowance. Means for using the timing variable to generate a MIC to be included in a D2D discovery announcement may also be included. Alternatively, the apparatus may include means for receiving a D2D discovery announcement including a MIC, and means for transmitting the received MIC and the timing variable to a ProSe function in the network. The apparatus may further include means for receiving authorization to participate in D2D discovery while the device is in the connected mode. Means for receiving a local timing variable via an SIB may also be included.

In certain examples, the apparatus may further include means for receiving an SIB for timing variable synchronization via an RRC message while the device is in the connected mode. In other examples, the apparatus includes means for requesting D2D discovery resources via an RRC message when the device is using a network controlled D2D discovery resource allocation scheme, wherein the timing variable is received via a response to the RRC message. The apparatus may include means for requesting D2D discovery resources via an RRC message when the device is using a device controlled D2D discovery resource allocation scheme.

According to another set of illustrative examples, an apparatus configured for wireless communication may include at least one processor and a memory coupled to the at least one processor. The at least one processor may be configured to receive a timing variable from a network at a device, the timing variable being received while the device is in a connected mode, and to use the timing variable for D2D discovery message authentication. The timing variable may be received from a ProSe function in the network. The timing variable may also be received with a D2D discovery application code, and may be UTC. The processor may be further configured to receive a timing offset allowance from the ProSe function in the network and to compare the timing variable received from the network with a local timing variable to determine whether a difference between the received timing variable and the local timing variable is less than the timing offset allowance. Additionally, the processor may be configured to announce the D2D discovery application code if the difference between the timing variable received from the network and the local timing variable is within the timing offset allowance.

According to yet another set of illustrative examples, a computer program product may include at least one processor and a non-transitory computer-readable medium having non-transitory program code recorded thereon. The non-transitory program code may include program code to receive a timing variable at a device from a network, the timing variable being received while the device is in a connected mode, and also program code to use the timing variable for D2D discovery message authentication. The timing variable may be received from a ProSe function in the network. The timing variable may also be received with a D2D discovery application code, and may be UTC. The program code may further include program code to receive a timing offset allowance from the ProSe function in the network and to compare the timing variable received from the network with a local timing variable to determine whether a difference between the received timing variable and the local timing variable is less than the timing offset allowance. Additionally, the program code may include program code to announce the D2D discovery application code if the difference between the timing variable received from the network and the local timing variable is within the timing offset allowance.

According to still another set of illustrative examples, a method of wireless communication in a wireless network may include entering into a connected mode with a device, and transmitting a timing variable for use in D2D discovery message authentication to the device while the device is in the connected mode. The timing variable may be transmitted from a ProSe function. The timing variable may be transmitted with a D2D discovery application code, and may be UTC. The method may include transmitting a timing offset allowance to the device, where the timing offset allowance is a maximum difference between the timing variable and a local timing variable at the device. In some examples, the method may also include receiving a discovery request including a proximity based service (ProSe) application ID from the device and sending a discovery response to the device including a timing variable, a D2D discovery application code, a key associated with the D2D discovery application code, and a timing offset allowance. Alternatively, the method may include transmitting an RRC message including an SIB that includes the timing variable. In other examples, the method may include receiving an RRC request for discovery resources, wherein transmitting the timing variable includes transmitting a response to the RRC request that includes the timing variable.

According to another set of illustrative examples, an apparatus for wireless communication in a wireless network may include means for entering into a connected mode with a device, and means for transmitting a timing variable for use in D2D discovery message authentication to the device while the device is in the connected mode. The timing variable may be transmitted from a ProSe function. The timing variable may be transmitted with a D2D discovery application code, and may be UTC. The apparatus may also include means for transmitting a timing offset allowance to the device, where the timing offset allowance is a maximum difference between the timing variable and a local timing variable at the device. The apparatus may also include means for receiving a discovery request including a ProSe application ID from the device and means for sending a discovery response to the device including a timing variable, a D2D discovery application code, a key associated with the D2D discovery application code, and a timing offset allowance. Additionally, the apparatus may include means for transmitting an RRC message including an SIB that includes the timing variable. In other examples, the apparatus includes means for receiving an RRC request for discovery resources, wherein transmitting the timing variable includes transmitting a response to the RRC request that includes the timing variable.

In another set of illustrative examples, an apparatus configured for wireless communication may include at least one processor and a memory coupled to the at least one processor. The at least one processor may be configured to enter into a connected mode with a device, and to transmit a timing variable for use in D2D discovery message authentication to the device while the device is in the connected mode. The timing variable may be transmitted from a ProSe function. The timing variable may be transmitted with a D2D discovery application code, and may be a UTC-based counter. The processor may be further configured to transmit a timing offset allowance to the device, where the timing offset allowance is a maximum difference between the timing variable and a local timing variable at the device. The processor may also be configured to receive a discovery request including a ProSe application ID from the device and to send a discovery response to the device including a timing variable, a D2D discovery application code, a key associated with the D2D discovery application code, and a timing offset allowance. Alternatively, the processor may be configured to transmit an RRC message including an SIB that includes the timing variable. In other examples, the processor may be further configured to receive an RRC request for discovery resources, wherein transmitting the timing variable includes transmitting a response to the RRC request that includes the timing variable.

According to yet another set of illustrative examples, a computer program product may include a non-transitory computer-readable medium having non-transitory program code recorded thereon. The non-transitory program code may include program code to enter into a connected mode with a device, as well as program code to transmit a timing variable for use in D2D discovery message authentication to the device while the device is in the connected mode. The timing variable may be transmitted from a ProSe function. The timing variable may be transmitted with a D2D discovery application code, and may be UTC. The program code may further include program code to transmit a timing offset allowance to the device, where the timing offset allowance is a maximum difference between the timing variable and a local timing variable at the device. The program code may also include program code to receive a discovery request including a ProSe application ID from the device and to send a discovery response to the device including a timing variable, a D2D discovery application code, a key associated with the D2D discovery application code, and a timing offset allowance. The program code may also include program code to transmit an RRC message including an SIB that includes the timing variable. In other examples, the program code includes program code to receive an RRC request for discovery resources, wherein transmitting the timing variable includes transmitting a response to the RRC request that includes the timing variable.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Typically, devices (i.e., user equipments (UEs)) engage in wireless communication by communicating with a base station of a wireless communications system. However, these devices may also participate in direct device-to-device (D2D) or proximity based service (ProSe) wireless communications. D2D discovery allows UEs that are within range of each other to communicate directly with each other instead of communicating through a base station. An example of when D2D wireless communication is desirable is when a UE intends to have a communication session with other UEs in close proximity, or just be visible to other UEs in the same location. The UE may broadcast a D2D discovery announcement, such as a Direct Peer-Discovery Signal in a Long Term Evolution (LTE) system, which may then be received by a UE in the proximity that is monitoring such discovery communications. The announcing UE may include a code such as a D2D discovery application code in the over-the-air (OTA) discovery announcement message. The D2D discovery application code may indicate the desired intent or function of the announcing UE. A monitoring UE may receive the D2D discovery announcement with its D2D discovery application code, and can then determine whether the monitoring UE is available to engage in D2D communications with the announcing UE.

However, without additional information or action, the monitoring UE may not be able to verify the authenticity of the D2D discovery announcement. In order to mitigate this potential security risk, the announcing UE may include in its D2D discovery announcement a Message Integrity Code (MIC) that monitoring UEs may use in coordination with a D2D discovery module in the wireless network to determine the authenticity of the D2D discovery communications. An element used during generation of the MIC is a timing variable. As generation of the MIC by an announcing UE and analysis of the MIC by a monitoring device require both UEs to have access to an accurate timing variable, there is a need to ensure that UEs are able to securely obtain or determine the timing variable.

The following description provides examples, and is not limiting of the scope, applicability, or configuration set forth in the claims. Changes may be made in the function and arrangement of elements discussed without departing from the spirit and scope of the disclosure. Various examples may omit, substitute, or add various procedures or components as appropriate. For instance, the methods described may be performed in an order different from that described, and various steps may be added, omitted, or combined. Also, features described with respect to certain examples may be combined in other examples.

Figure 1:
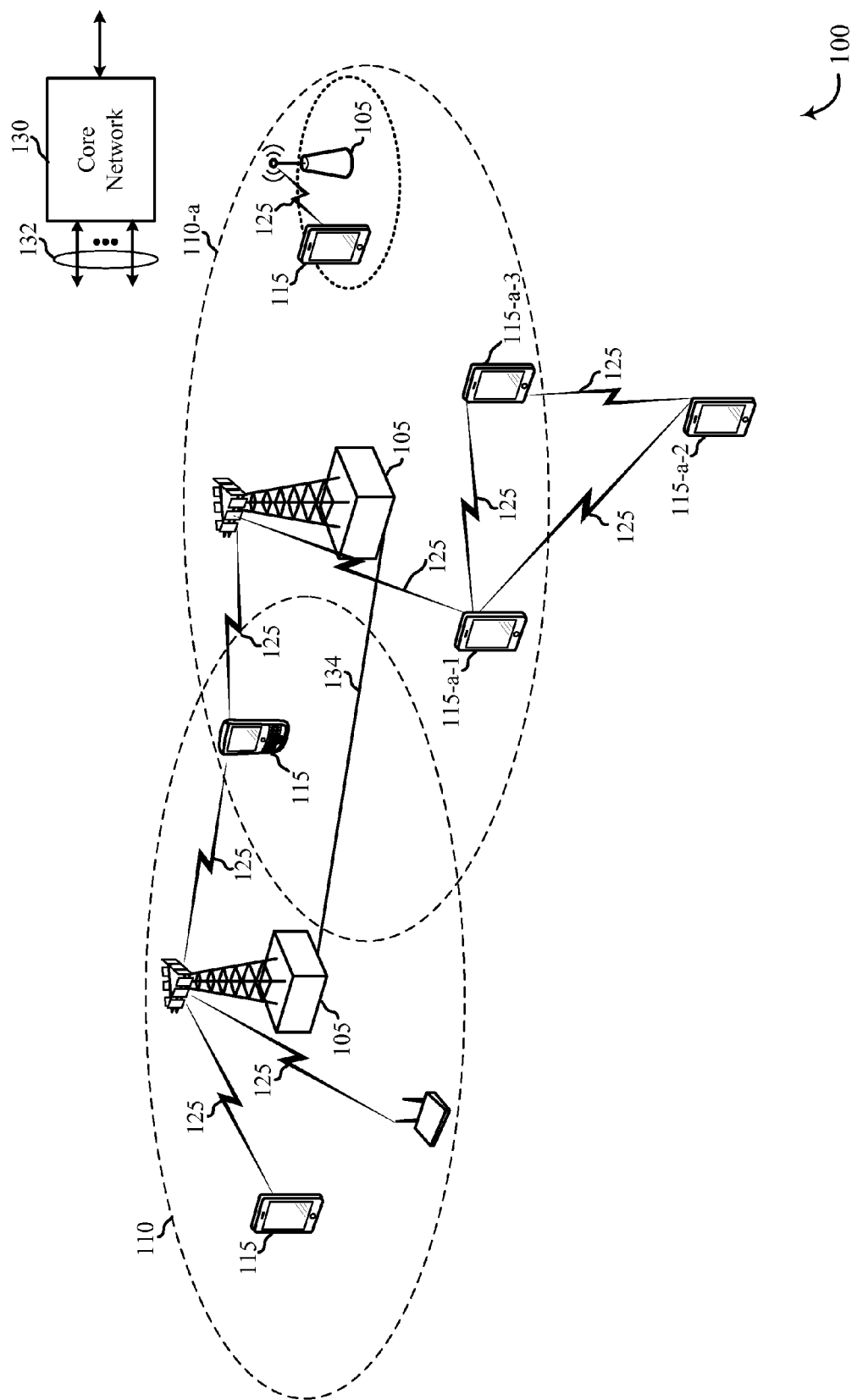
FIG. 1 shows a block diagram of an example of a wireless communications system, in accordance with various aspects of the present disclosure.

FIG. 1 shows a block diagram of an example of a wireless communications system 100, in accordance with various aspects of the present disclosure. The wireless communications system 100 includes base stations (or cells) 105, communication devices 115, and a core network 130. The base stations 105 may communicate with the communication devices 115 under the control of a base station controller (not shown), which may be part of the core network 130 or the base stations 105 in various examples. Base stations 105 may communicate control information or user data with the core network 130 through backhaul links 132. In examples, the base stations 105 may communicate, either directly or indirectly, with each other over backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

The base stations 105 may wirelessly communicate with the UEs 115 via one or more base station antennas. Each of the base station 105 sites may provide communication coverage for a respective coverage area 110. In some examples, a base station 105 may be referred to as a base transceiver station, a radio base station, an access point, a radio transceiver, a basic service set (BSS), an extended service set (ESS), a NodeB, an eNodeB (eNB), a Home NodeB, a Home eNodeB, or some other suitable terminology. The coverage area 110 for a base station may be divided into sectors making up only a portion of the coverage area (not shown). The wireless communications system 100 may include base stations 105 of different types (e.g., macro, micro, or pico base stations). There may be overlapping coverage areas for different technologies.

In examples, the wireless communications system 100 is an LTE/LTE-A network. In LTE/LTE-A networks, the terms evolved Node B (eNB) and UE may be generally used to describe the base stations 105 and UEs 115, respectively. The wireless communications system 100 may be a Heterogeneous LTE/LTE-A network in which different types of base stations provide coverage for various geographical regions. For example, each base station 105 may provide communication coverage for a macro cell, a pico cell, a femto cell, or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro eNB, for example. A base station for a pico cell may be referred to as a pico eNB. And, a base station for a femto cell may be referred to as a femto eNB or a home eNB. A base station may support one or multiple (e.g., two, three, four, and the like) cells.

The core network 130 may communicate with the base stations 105 via backhaul links 132 (e.g., S1, etc.). The base stations 105 may also communicate with one another, e.g., directly or indirectly via backhaul links 134 (e.g., X2, etc.) or via backhaul links 132 (e.g., through core network 130). The wireless communications system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Base stations 105 may also communicate information and commands to UEs 115. For example, when a UE 115 enters into a connected mode with a base station 105, the base station 105 and UE 115 mutually authenticate each other. Once authenticated, the base station 105 may securely communicate information to the UE 115. Among the information that may be communicated from a base station 105 to a UE 115 is information pertaining to the current time or some other timing variable so that the UE 115 can be fully synchronized with the base station 105 (and other devices in the wireless communication system 100). The current time or other timing variable may be used by the UE 115 during authentication of a D2D discovery message, as further explained in the examples below.

The UEs 115 are dispersed throughout the wireless communications system 100, and each UE may be stationary or mobile. A UE 115 may also be referred to by those skilled in the art as a user device, a mobile device, a mobile station, a subscriber station, a mobile unit, a subscriber unit, a wireless unit, a remote unit, a wireless device, a wireless communications device, a remote device, a mobile subscriber station, an access terminal, a mobile terminal, a wireless terminal, a remote terminal, a handset, a user agent, a mobile client, a client, a relay, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like. A UE 115-a may also communicate directly with another UE 115 via D2D wireless communications. In one example, a UE 115-a-1 within a coverage area 110-a of a base station 105 may serve as a relay for UE 115-a-2 that is outside the coverage area 110-a of the base station 105. The in-coverage UE 115-a-1 may relay (or retransmit) communications from the base station 105 to the out-of-coverage UE 115-a-2. Similarly, the in-coverage UE 115-a-1 may relay communications from the out-of-coverage UE 115-a-2 to the base station 105. Additionally, D2D wireless communication may occur between UEs 115 that are each in-coverage and may occur for many different reasons. Thus, in-coverage UE 115-a-1 may engage in D2D wireless communication with in-coverage UE 115-a-3. UE 115-a-3 may also engage in D2D wireless communication with UE 115-a-2.

In order for a UE 115 to participate in D2D wireless communication, the UE 115 may first participate in D2D discovery. D2D discovery allows UEs 115 to discover other UEs enabled to participate in D2D communication. D2D discovery includes an announcing UE that broadcasts a D2D discovery announcement, and a monitoring UE that monitors for D2D discovery announcements. A monitoring UE may receive a D2D discovery announcement and may then respond and engage in D2D wireless communications with the announcing UE. However, the exclusion of the base station or other network modules from this D2D communication can expose the communication to security risks. Examples of these risks, and how to mitigate them, are explained below.

The communication links 125 shown in wireless communications system 100 may include uplink (UL) transmissions from a UE 115 to a base station 105, or downlink (DL) transmissions, from a base station 105 to a UE 115. The downlink transmissions may also be called forward link transmissions while the uplink transmissions may also be called reverse link transmissions. The communication links 125 may also include D2D messages (including D2D discovery messages) exchanged between UEs 115.

Figure 2:
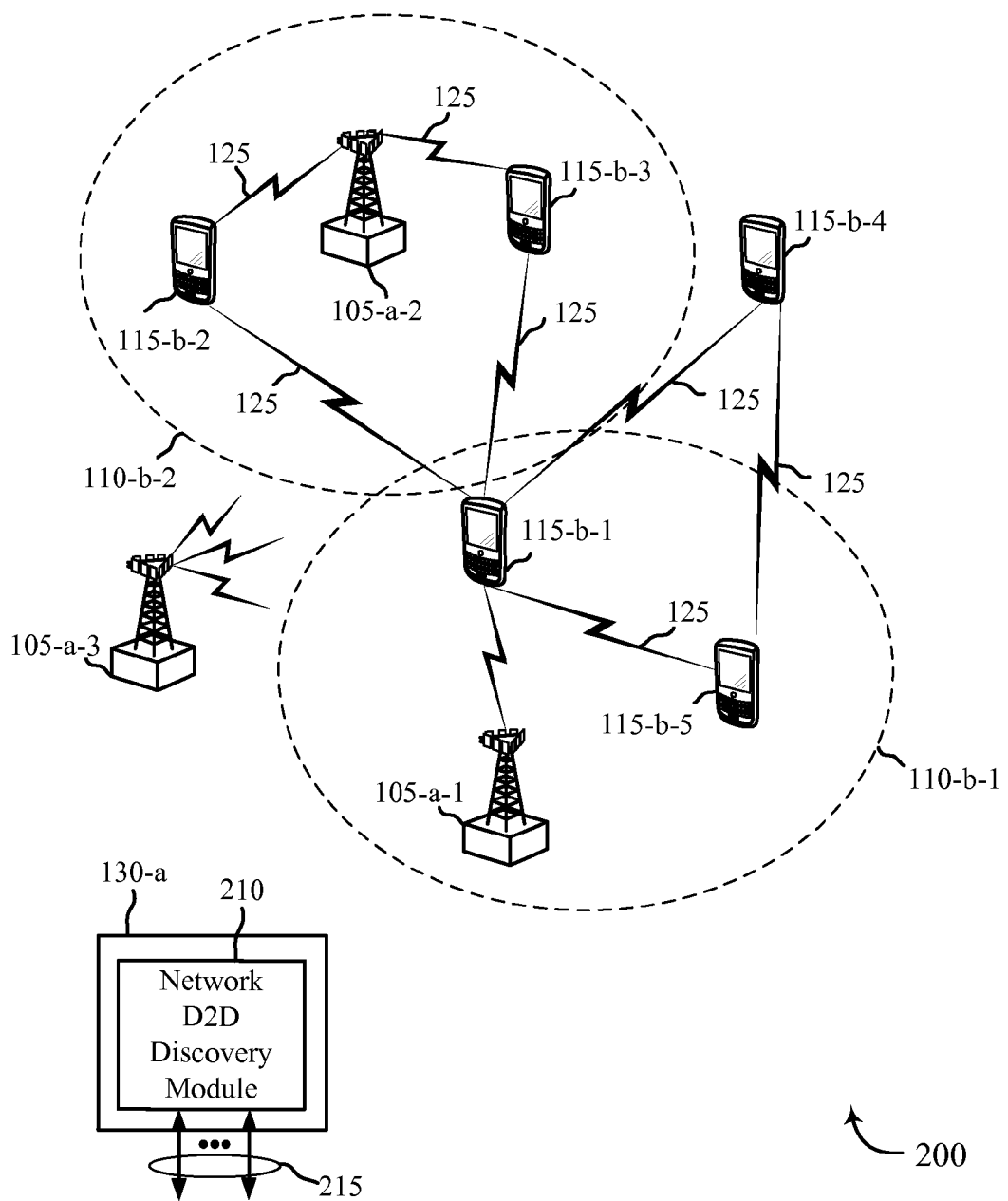
FIG. 2 is shows block diagram of an example of a system for device-to-device (D2D) discovery and wireless communication, in accordance with various aspects of the present disclosure.

FIG. 2 shows a block diagram of an example of a system 200 for D2D discovery and wireless communication, in accordance with various aspects of the present disclosure. The system 200 of FIG. 2 may be an example of the wireless communication system 100 described with respect to FIG. 1. In one configuration, a base station 105-a-1 may communicate with one or more devices that fall within a coverage area 110-b-1 of the base station 105-a-1. An in-coverage UE 115-b-1 may receive/transmit communications from/to the base station 105-a-1. One or more UEs 115-b-2, 115-b-3, 115-b-4 may be outside of the coverage area 110-b-1 of the base station 105-a-1 and may participate in D2D communications. Other UEs 115-b-5 may be within the coverage area 110-b-1 of the base station 105-a-1, but may also still participate in D2D communications. UEs 115-b-2, 115-b-3 may also be within the coverage area 110-b-2 of a different base station 105-a-2 and may be in communication with base station 105-a-2. The base stations 105-a and the UEs 115-b may be examples of the base stations 105 and UEs 115 described with reference to FIG. 1.

In one embodiment, the in-coverage UE 115-b-1 may broadcast, multi-cast, or unicast a D2D discovery signal via communication link 125. The signal may be sent to one or more UEs that are either in- or out-of-coverage. The D2D discovery signal may be a D2D discovery announcement message. The D2D discovery announcement message may indicate, for example, an identifier of the in-coverage UE 115-b-1. For example, the identifier may be a medium access control (MAC) address of the in-coverage UE 115-b-1. In addition, the D2D discovery signal may include a D2D discovery application code of the UE 115-b-1.

In one configuration, an out-of-coverage UE may transmit a D2D discovery signal to one or more in-coverage UEs 115-b-1. The peer discovery signal may indicate that the out-of-coverage UE is out-of-coverage or requesting relay services. The signal may include an identifier of the out-of-coverage UE. In one configuration, a UE may broadcast a D2D discovery signal when it senses that it is about to be out of the coverage area 110-b-1 of the base station 105-a-1. In another embodiment, a UE may broadcast the signal after it is already out of the coverage area 110-b-1.

As an additional example, two in-coverage UEs 115-b-1, 115-b-5 may also communicate with each other via a direct D2D connection. In this example, UE 115-b-5 may transmit a signal requesting a direct D2D connection with other UEs proximate to UE 115-b-5. UE 115-b-1 may receive the request and then initiate direct D2D communications with UE 115-b-5. In an additional example, UEs 115-b-2, 115- b-3, may each communicate with UE 115-b-1 via direct D2D connections. For example, the UE 115-b-1 may act as a relay to the UEs 115-b-2, 115-b-3.

Before a UE 115 may participate in D2D wireless communication, the UE 115 may first be authorized. Authorization is granted by the core network 130-a. Specifically, the core network 130-a may include a network D2D discovery module 210 that is enabled to authorize D2D communication. An example of a network D2D discovery module 210 is a ProSe Function. A UE 115 may request authorization for D2D communication by communicating with the network D2D discovery module 210 via a wireless interface 215 such as a PC3 interface. The network D2D discovery module 210 may respond by authorizing the requesting UE 115.

During authorization of D2D communications, the network D2D discovery module 210 generates a D2D discovery application code such as a ProSe App Code. The D2D discovery application code corresponds to the D2D function to be engaged in by the announcing UE 115-b-1, for example. Thus, once authorized, the announcing UE 115-b-1 may broadcast the D2D discovery application code as part of a D2D discovery announcement.

The network D2D discovery module 210 may also be used to generate security elements used by a UE 115 participating in D2D discovery to secure the D2D discovery messages. Protection can be afforded against rogue base stations, such as base station 105-a-3 in system 200. Base station 105-a-3 may be a used to hijack D2D communications originating from a UE 115. Therefore, a security scheme may be used by the UEs 115 and the network D2D discovery module 210 to protect against the risk of a rogue base station 105-a-3.

Figure 3:
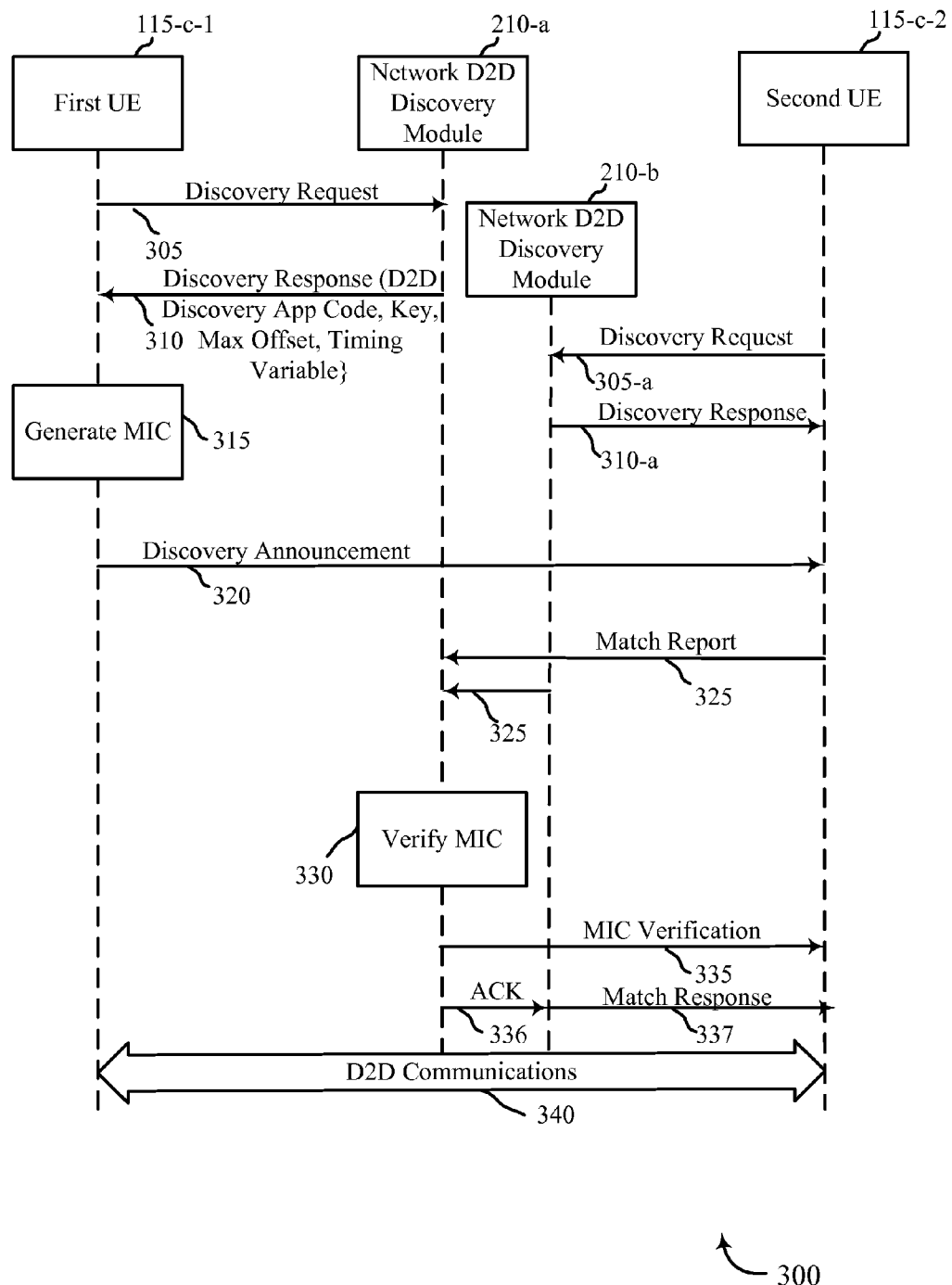
FIG. 3 shows a message flow diagram illustrating communications between user equipments (UEs) engaging in D2D discovery and a proximity based service (ProSe) function in a network, in accordance with various aspects of the present disclosure.

FIG. 3 shows a message flow diagram 300 illustrating a security scheme used by UEs 115-c-1, 115-c-2 engaging in D2D discovery and a network D2D discovery module 210-a, in accordance with various aspects of the present disclosure. The UEs and network D2D discovery module may be examples of the UEs 115 described in FIGS. 1 and/or 2 and the network D2D discovery module 210 described in FIG. 2.

The announcing UE 115-c-1 may send a discovery request 305 to the network D2D discovery module 210-a in the network to be allowed to announce a D2D discovery application code to other devices such as the monitoring UE 115-c-2. In response, the D2D discovery module 210-a in the network may return a D2D discovery application code to the announcing UE 115-c-1. In addition to generating a D2D discovery application code for the announcing UE 115-c-1, the network D2D discovery module 210-a may also generate a key associated with the D2D discovery application code. The network D2D discovery module 210-a may transmit to the announcing UE 115-c-1 a discovery response message 310 that includes the D2D discovery application code and the associated key. Additionally, the network D2D discovery module 210-a may provide the announcing UE 115-c-1 with a CURRENT_TIME parameter, which may include current timing information (e.g., a timing variable) at the D2D discovery module 210-a and a timing offset allowance. The D2D discovery module 210-a in the network may be a ProSe function in either Home Public Land Mobile Network (HPLMN) or Visited PLMN (VPMLN) serving the UE. The timing offset allowance may be referred to herein as a MAX_OFFSET indicating a maximum difference between the timing variable and a local timing variable at a UE. The announcing UE 115-c-1 may use the received D2D discovery application code and the associated key, as well as a timing variable, to generate a message integrity code (MIC) (at step 315). The timing variable may be an element of timing information, such as a coordinated universal time (UTC) or some other system time. Alternatively, the timing variable may be a counter value that increments, for example, every D2D discovery period and does not wrap-around very frequently. In either case, the timing variable may be obtained from other sources. For example, the timing variable could be obtained via a network identity and time zone (NITZ), a network time protocol (NTP), a broadcast system information block 16 (SIB 16), or a global positioning system (GPS), etc. The announcing UE 115-c-1 may then compare the timing variable received from the D2D discovery module 210-a with a local timing variable to determine whether a difference between the received timing variable and the local timing variable is within the timing offset allowance (e.g., MAX_OFFSET). If it is determined that a difference between the timing variable received from the network and the local timing variable is within the timing offset allowance, the announcing UE 115-c-1 may start announcing the D2D application code such as a ProSe App code. If the difference is greater than the timing offset allowance, the announcing UE 115-c-1 may recognize that an anomaly has occurred and attempt some other method, which may be pre-configured or configured by a ProSe function, to receive an updated timing variable. For example, the announcing UE 115-c-1 may inform the ProSe function of the anomaly. Or, the announcing UE 115-c-1 may transition to a CONNECTED mode and make a request to a base station (e.g., an eNB) for an updated timing variable via RRC messages.

The announcing UE 115-c-1 may generate the MIC to be included in the D2D discovery application code using the associated discovery key and the timing variable (at step 315). The announcing UE 115-c-1 may then include the MIC with the D2D discovery application code in its D2D discovery announcement message 320. The monitoring UE 115-c-2 may be served by a different network than the network servicing the announcing UE 115-c-1. Thus, a network D2D discovery module of the monitoring UE 115-c-2 may be different from the network D2D discovery module 210-a of the announcing UE 115-c-1. In such cases, the D2D discovery module of the monitoring UE and that of the announcing UE may exchange a monitor request and response messages.

Prior to receiving the D2D discovery announcement message 320, the monitoring UE 115-c-2 may exchange discovery request 305-a and response messages 310-a with a D2D discovery module 210-b of its own network. For example, the monitoring UE 115-c-2 may send a discovery request message containing a D2D application code to the D2D discovery module (e.g., ProSe function) in the network to obtain discovery filter(s) that it wants to listen for. The D2D discovery module in the network may then return the discovery filter containing either the D2D application code, and ProSe mask(s) or both along with a CURRENT_TIME and a MAX_OFFSET parameters. Then, the monitoring UE 115-c-2 may set its ProSe clock to the CURRENT_TIME and store the MAX_OFFSET overwriting any previous values. Like the announcing UE 115-c-1, the monitoring UE 115-c-2 may have received a timing variable from various sources available to the monitoring UE 115-c-2 (e.g., SIB 16, NITZ, NTP, or GPS). The received timing variable may be stored by the monitoring UE 115-c-2 and incremented in accordance with the type of timing information represented by the timing variable. With the received discovery filter, the monitoring UE-c-2 may listen for a discovery announcement message that matches the discovery filter if the timing variable is within the MAX_OFFSET of its ProSe clock.

When a monitoring UE 115-c-2 receives the D2D discovery announcement message 320, the monitoring UE 115-c-2 transmits in a message 325 the received D2D discovery application code and the MIC to the network D2D discovery module 210-a for validation. The message 320 also includes the timing variable, as known by the monitoring UE 115-c-2. In some examples, the message may be a match report 325 containing a UTC-based timing variable with four least significant bits (LSB) equal to four LSB received along with the discovery announcement message and nearest to the monitoring UE's timing variable associated with a discovery slot where it heard the discovery announcement. In cases in which a network D2D discovery module of the monitoring UE 115-c-2 is different from the network D2D discovery module 210-a of the announcing UE 115-c-1, the D2D discovery module 210-b of a network serving the monitoring UE 115-c-2 passes the match report 325 to the D2D discovery module 210-a of the network serving the announcing UE 115-c-1.

The network D2D discovery module 210-a verifies the MIC (at step 330) by using the timing variable received from the monitoring UE 115-c-2. For example, the MIC may be validated if the timing variable received from the monitoring UE 115-c-2 is within a timing offset allowance. The MIC may be validated if the timing variable used by the announcing UE 115-c-1 to generate the MIC is similar to the timing variable transmitted to the network D2D discovery module 210-a by the monitoring UE 115-c-2. If the MIC is validated, the network D2D discovery module 210-a notifies the monitoring UE 115-c-2 via message 335, potentially with additional information for the D2D communication. In cases in which a network D2D discovery module 210-b of the monitoring UE 115-c-2 is different from the network D2D discovery module 210-a of the announcing UE 115-c-1, a D2D discovery module 210-a of the announcing UE 115-c-1 may send an acknowledgment of a successful verification of the MIC to a D2D discovery module 210-b of the network serving the monitoring UE 115-c-2 in a match report ACK message 336. The D2D discovery module 210-b of the monitoring UE 115-c-2 may then send a match response 337 to the monitoring UE 115-c-2. Then, the monitoring UE 115-c-2 can engage in D2D wireless communications 340 with the announcing UE 115-c-1.

In the above-described security scheme, both the announcing and the monitoring UEs may use an unprotected time to obtain timing variables associated with a discovery slot. This means that the discovery announcement message could be successfully replayed by an attacker, such as a rogue base station 105-a-3 (of FIG. 2), if the UE is fooled into using a time different from a current time.

For example, rogue base station 105-a-3 may be used to broadcast a different system time in an SIB that is ahead of an actual UTC. If an announcing UE synchronizes to the broadcast time, the announcing UE will broadcast a MIC that is based on a timing variable whose time value has not yet occurred. The rogue base station 105-a-3 can receive the D2D discovery announcement message from the announcing UE and store the associated D2D discovery application code and MIC. Then, at a later time that corresponds to the time falsely broadcast by the rogue base station 105-a-c, the attacker may "replay" as a broadcast the stored D2D discovery application code and MIC, thus potentially fooling other monitoring UEs into engaging in D2D communications with the illicit entity.

In another example, an attacker may record a broadcast D2D discovery announcement from an announcing UE, recording both the D2D discovery application code and the MIC as well as the system time when the D2D discovery announcement was broadcast. At some later time, the attacker may deploy a rogue base station 105-a-3 which broadcasts an SIB which includes the wrong timing variable. Instead of including the correct time, the falsely broadcast SIB includes the system time corresponding to when the announcing UE broadcast its D2D discovery announcement. If a monitoring UE synchronizes its timing variable to the falsely broadcast SIB, then the attacker is able to replay the recorded D2D discovery message and thereby fool the monitoring UE into engaging in D2D communications with the attacker.

Therefore, methods and apparatuses are disclosed herein to preclude such replay attacks involving the timing variable. In disclosed examples, both the announcing and the monitoring UEs may be able to obtain and synchronize with the a received timing variable in a secure manner.

The timing offset allowance (e.g., MAX_OFFSET) may be used to limit the ability of an attacker to successfully replay discovery messages or obtain correctly integrity-checked discovery message for later use. For example, the MAX_OFFSET is used as a maximum difference between the UTC-based time associated with a discovery slot and a local timing variable stored at the monitoring device (e.g., a ProSe clock held by the monitoring device). In some examples, a UE may receive the timing variable when the UE is in a connected mode to securely obtain the timing variable. For example, when a UE is in a radio resource control (RRC) connected mode, the UE and the connected entity (for example, a base station) are mutually authenticated. Thus, information exchanged between the connected entities at this time may be secured. A timing variable received by the UE while the UE is in a connected mode may therefore be considered secure or can at least be verified as being valid.

Because entering a connected mode is expensive in terms of battery life, spectrum and processing at the UE, receipt of the timing variable should occur at times when the UE is already in the connected mode. In other words, the UE should avoid entering a connected mode simply for purposes of obtaining and synchronizing to a timing variable. Instead, the UE may obtain the timing variable when the UE has entered into a connected mode, for example, to obtain D2D discovery authorization. Thus, while being authorized for D2D discovery communications, the UE may also obtain the timing variable.

Figure 4:
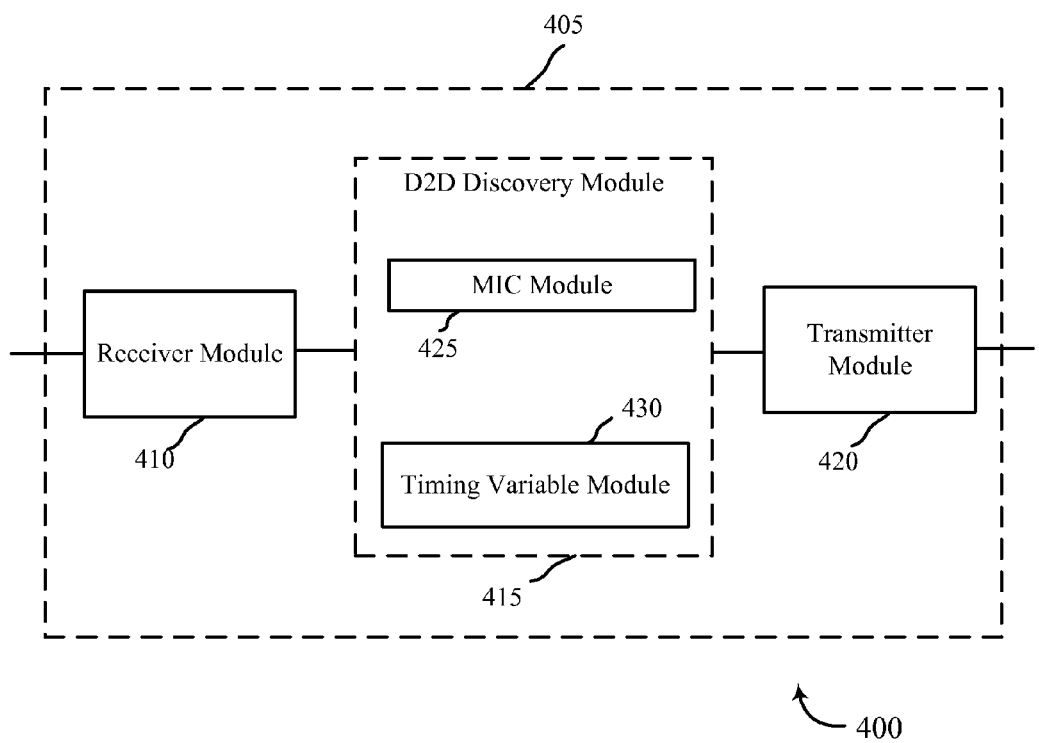
FIG. 4 shows a block diagram of an apparatus for use in wireless communication, in accordance with various aspects of the present disclosure.

FIG. 4 shows a block diagram 400 of an apparatus 405 for use in wireless communication, in accordance with various aspects of the present disclosure. In some examples, the apparatus 405 may be an example of aspects of one or more of the UEs 115 described with reference to FIGS. 1, 2 and/or 3, and may engage in D2D wireless communication. The apparatus 405 may also be a processor. The apparatus 405 may include a receiver module 410, a D2D discovery module 415, and/or a transmitter module 420. Each of these components may be in communication with each other.

The components of the apparatus 405 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 410 may include at least one radio frequency (RF) receiver, such as at least one RF receiver operable to receive transmissions over a radio frequency spectrum. In some examples, the radio frequency spectrum may be used for LTE/LTE-A communications, as described, for example, with reference to FIGS. 1, 2 and/or 3. The receiver module 410 may be used to receive various types of data or control signals (i.e., transmissions) over one or more communication links of a wireless communications system, such as one or more communication links 125 of the wireless communications system 100 described with reference to FIGS. 1 and/or 2. Additionally, the receiver module 410 may also be used to receive D2D communications over one or more communication links of a wireless communications system, such as one or more communication links 125 of the wireless communications system 100. Specific examples of some types of D2D communications received by the receiver module 410 include messages 305, 315 and 330, as well as D2D wireless communications 335, as described with reference to FIG. 3.

In some examples, the transmitter module 420 may include at least one RF transmitter, such as at least one RF transmitter operable to transmit D2D messages. The transmitter module 420 may be used to transmit various types of data or control signals (i.e., transmissions) over one or more communication links of a wireless communications system, such as one or more communication links 125 of the wireless communications system 100 described with reference to FIGS. 1 and/or 2. Additionally, the transmitter module 420 may also be used to transmit D2D communications over one or more communication links 125. Examples of the types of data or control signals transmitted by the transmitter module 420 include messages 315 and 320, as well as D2D wireless communications 335, as described with reference to FIG. 3.

In some examples, the D2D discovery module 415 may be used to manage the reception and transmission of D2D discovery messages and D2D communication via the receiver module 410 and/or the transmitter module 420. Managing the transmission and receipt of D2D discovery messages may include receiving D2D discovery application codes and keys from a network D2D discovery module, transmitting D2D discovery application codes, MICs and local timing variables, and receiving MIC verification, as is demonstrated in the messages 305, 310, 315, 320, 325, and 335 and step 310 of FIG. 3. The MIC module 425 of the D2D discovery module 415 may be used, in an announcing UE, to generate a MIC from D2D discovery application codes, keys and timing variables received from a network. The MIC module 425 may also be used to assist in verifying a MIC in a monitoring UE. Furthermore, in order to improve the security of the MIC, the D2D discovery module 415 may include a timing variable module 430 which can be used to receive and store the timing variable used to generate and/or to verify the MIC. The timing variable module 430 can do this using several different alternative methods.

Figure 5:
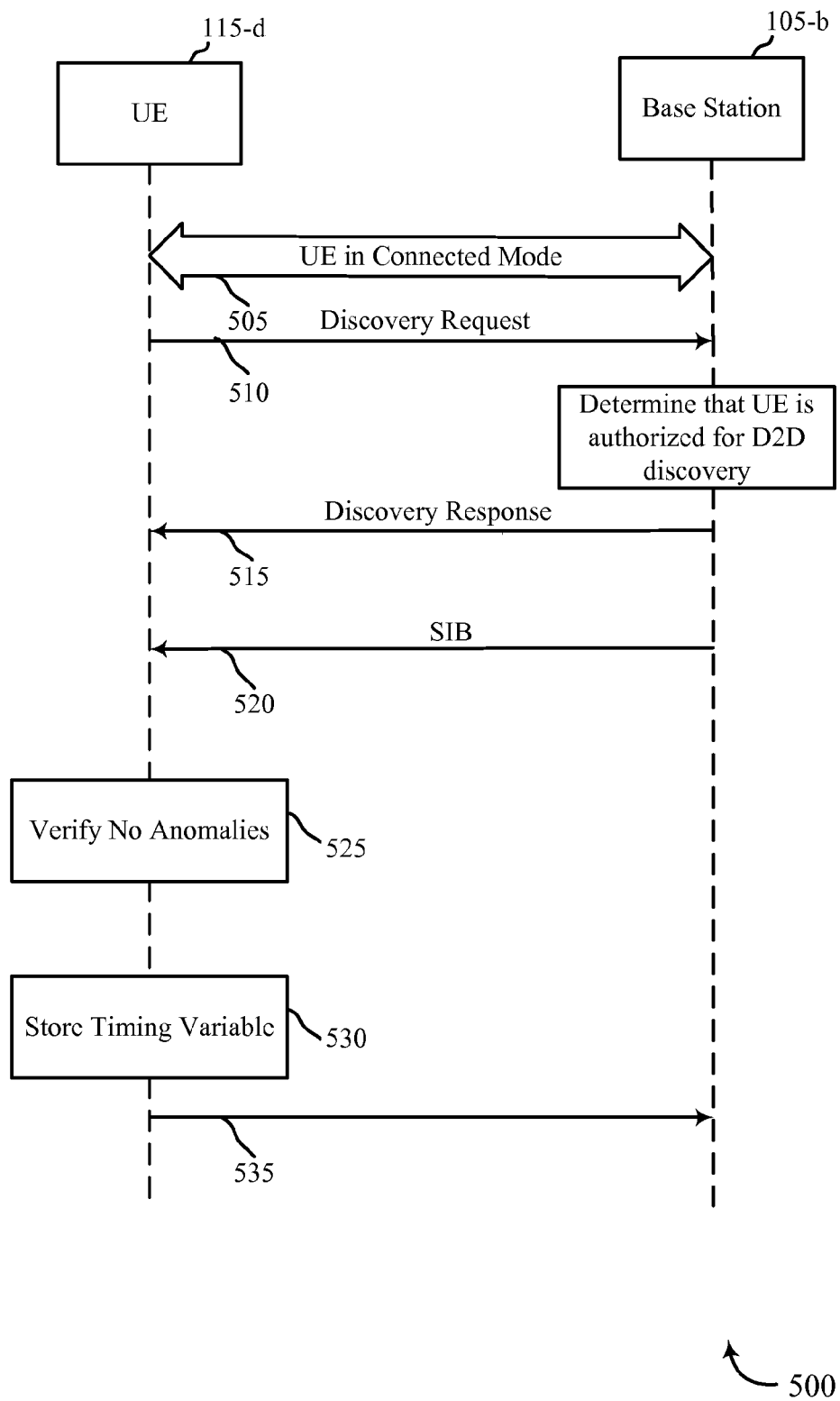
FIG. 5 shows a message flow diagram illustrating communications between a UE engaging in D2D discovery and a base station, in accordance with various aspects of the present disclosure.

FIG. 5 shows a message flow diagram 500 illustrating communications between a UE 115-d engaging in D2D discovery and a base station 105-b, in accordance with various aspects of the present disclosure. The UE and base station may be examples of the UEs 115 described in FIGS. 1, 2, 3, and/or 4 and the base stations 105 described in FIGS. 1 and/or 2.

Once the UE 115-d is in a connected mode 505 with base station 105-b, the UE 115-d and base station 105-b are mutually authenticated and thus communications exchanged between the two entities during this connected mode 505 may be secure. The base station 105-b is able to determine (at block 510) if the UE 115-d has been authorized to participate in D2D discovery communications (for example, via receipt of an authorization from a network D2D discovery module). The UE 115-d may send a discovery request message 510 to the base station 105-b in order to be allowed to announce a D2D discovery application code. In response, the base station 105-b may returns the D2D discovery application code and a discovery key associated with the code so that the UE 115-d can announce. Once the base station 105-b recognizes that the UE 115-d is a D2D UE, the base station 105-b may send discovery response 515 to the UE 115-d, which include the application code and the associated discovery key. The discovery response may also include a CURRENT_TIME parameter, which may include a UTC-based time at the D2D discovery module 210-a, a MAX_OFFSET, and/or a validity timer as described with reference to FIG. 3.

When the UE 115-d receives the discovery response 515, the UE 115-d may set a clock it uses for authentication (e.g., a ProSe clock) to the value of the CURRENT_TIME and store the MAX_OFFSET, overwriting previous values. In some examples, the UE 115-d may receive a value for a UTC-based counter associated with a discovery slot. The counter may be set to a value of UTC time in a granularity of seconds. In some cases, the UE 115-d seeks to detect and obtain the timing variable via, for example, a SIB broadcast message 520. For example, the UE 115-d may obtain an SIB broadcasting schedule via SystemInformationBlockType1, which is normally acquired by a UE in a connected mode. The SIBs are generally transmitted in downlink channel DL_SCH. When the UE 115-d receives the SIB and the timing variable included within the SIB, the UE 115-d may verify that no anomalies have occurred (step 525) and then may store the received timing variable to compare it with its ownlocal timing variable (step 530).

Verification that no anomalies have occurred may be necessary in certain situations where a rogue base station is active. For example, the rogue base station could also receive the SIB scheduling information from the legitimate base station 105-b and then attempt to inject a timing-related SIB in the same broadcast slot scheduled by the legitimate base station 105-b. Thus, in this situation, the UE 115-d may observe multiple SIBs of the same type being broadcast at the same time. Many UEs are unable to handle the receipt of two SIBs of the same type within the same broadcast slot and may default to just reading one of the received SIBs. Other UEs are able to receive multiple SIBs of the same type, but may then compare timing variables (e.g., the UTC-based time) included in the received SIBs to determine if there is a conflict. If the UE 115-d receives multiple SIBs of the same type, or determines that there is a discrepancy between the received timing variables of the received SIBs, the UE 115-d may elect not to store and synchronize the received timing variable but to continue to use its own local copy. Additionally, the UE 115-d may elect to use a different method (as described below) for obtaining an updated timing variable.

When a rogue base station broadcasts an SIB at the same time that the legitimate base station 105-b broadcasts the same type of SIB, various anomalies may occur at the UE 115-*d*. As described above, the UE 115-*d* may receive both of the broadcast SIBs. Alternatively, the broadcast SIBs may collide with each other, in which case the UE 115-*d* is unable to receive either of the broadcast SIBs. In yet another case, the illegitimate SIB may be broadcast with sufficient power so that the UE 115-*d* only detects the fake SIB. Thus, it is useful for the UE 115-*d* to compare the received timing variable with its own local copy and determine if there is a significant discrepancy. If there is a significant discrepancy (i.e., the discrepancy exceeds some predetermined threshold), then the UE 115-*d* can recognize that an anomaly has occurred and that the UE 115-*d* should attempt some other method for receiving an updated timing variable.

Figure 6:
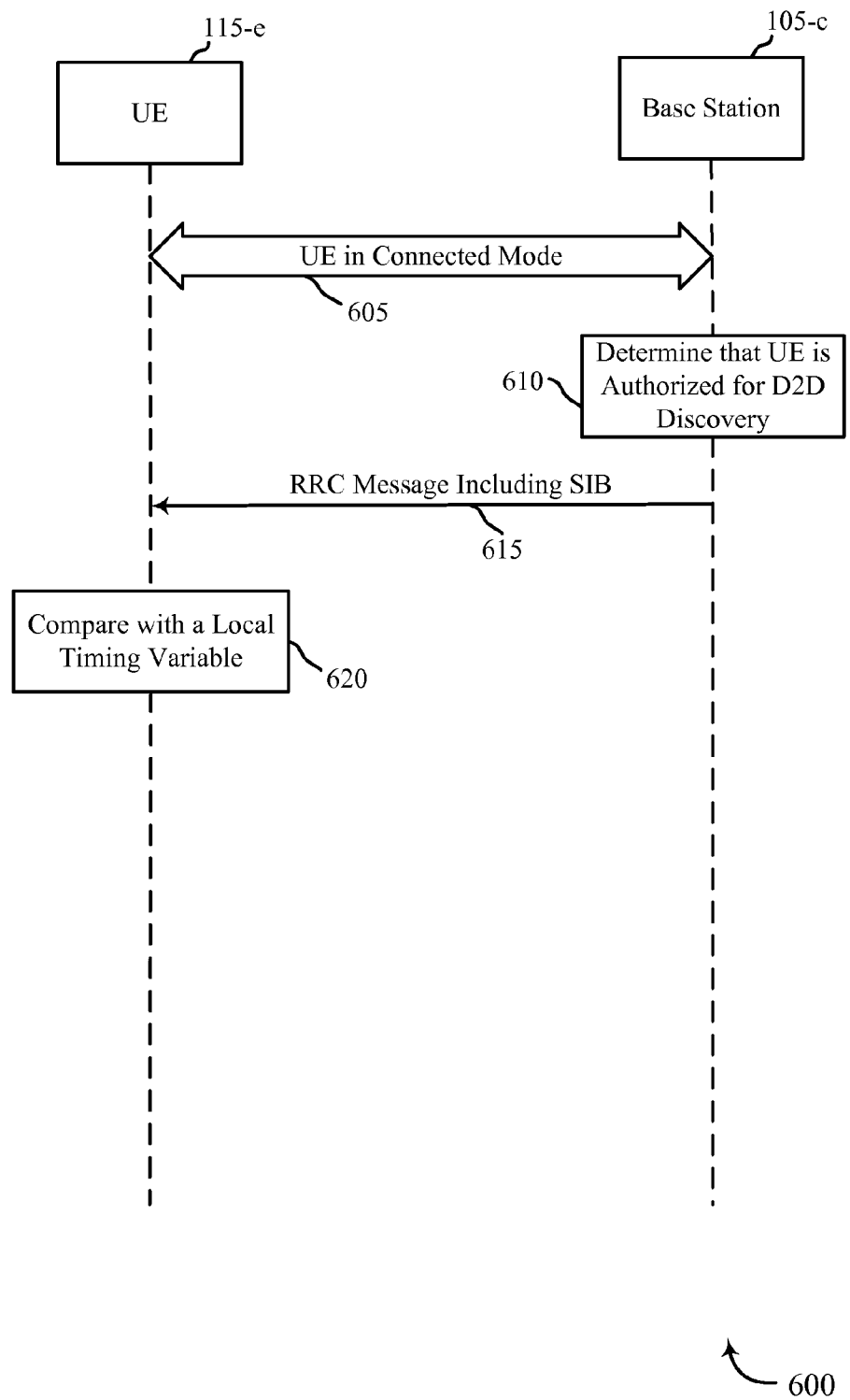
FIG. 6 shows a message flow diagram illustrating communications between a UE engaging in D2D discovery and a base station, in accordance with various aspects of the present disclosure.

FIG. 6 illustrates a method for obtaining a timing variable. FIG. 6 shows a message flow diagram 600 illustrating communications between a UE 115-*e* engaging in D2D discovery and a base station 105-*c*, in accordance with various aspects of the present disclosure. The UE and base station may be examples of the UEs 115 described in FIGS. 1, 2, 3, and/or 4 and the base stations 105 described in FIGS. 1 and/or 2.

Once the UE 115-*e* is in a connected mode 605 with base station 105-*c*, the UE 115-*e* and base station 105-*c* are mutually authenticated and thus communications exchanged between the two entities during this connected mode 605 may be secure. The base station 105-*c* is able to determine (at block 610) if the UE 115-*e* has been authorized to participate in D2D discovery communications (for example, via receipt of an authorization from a network D2D discovery module). Once the base station 105-*c* recognizes that the UE 115-*e* is a D2D UE, the base station 105-*c* may proactively forward an RRC message 615 to the UE 115-*e* without waiting for a request from the UE 115-*e*. The RRC message 615 may include an SIB with the needed timing variable. For example, the RRC message 615 may be an RRCConnectionReconfiguration message and may include SIB16 or some other SIB dedicated to D2D communications that includes the timing variable. Once the UE 115-*e* receives the timing variable via the RRC message 615, the UE 115-*e* may compare its own local timing variable to the received timing variable (step 620). It is noted that the base station may only send the additional timing variable in the signaling towards the UE authorized for the D2D communication, therefore maintaining legacy support by not affecting other UEs not participating in the D2D communication.

Figure 7:
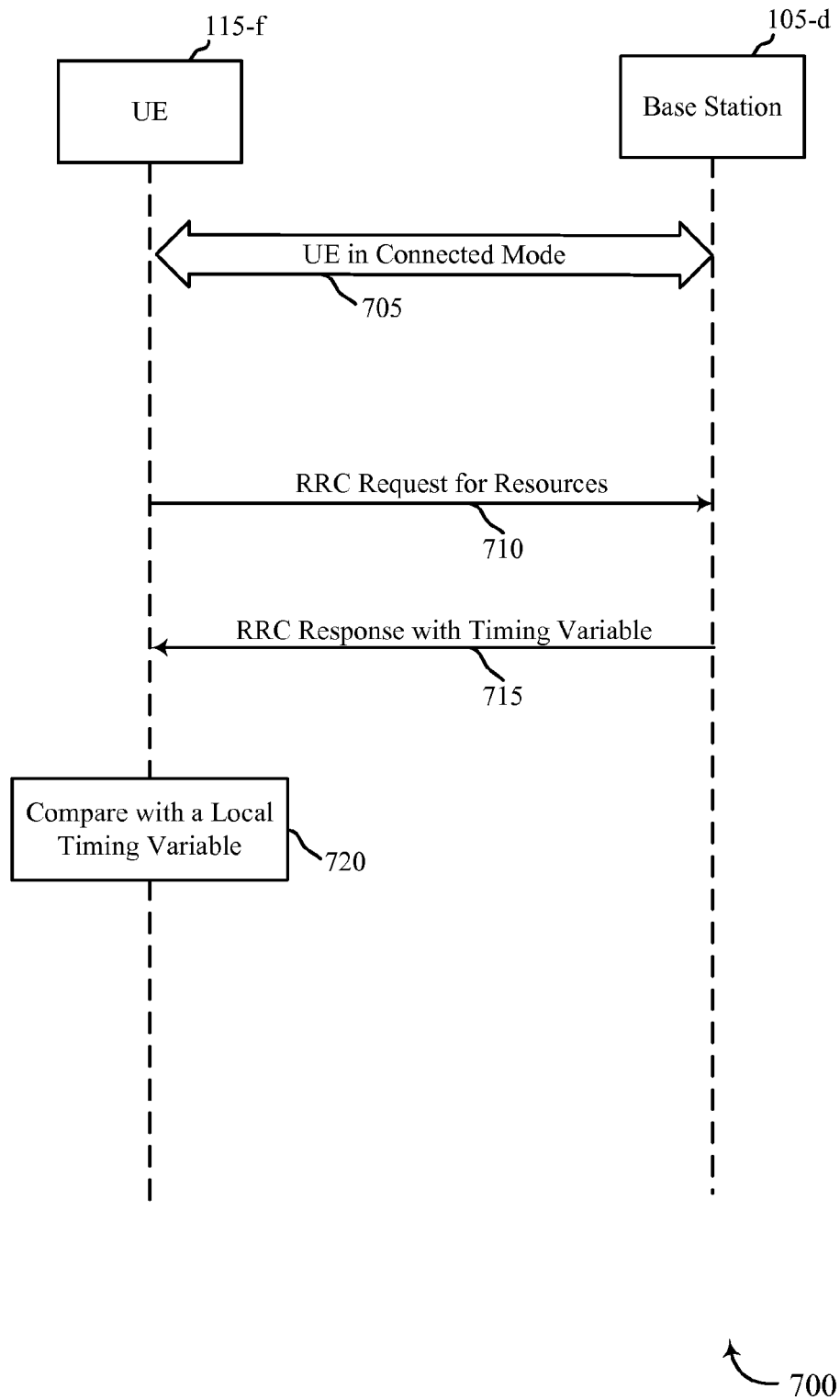
FIG. 7 shows a message flow diagram illustrating communications between a UE engaging in D2D discovery and a base station, in accordance with various aspects of the present disclosure.

FIG. 7 illustrates yet another method for obtaining a timing variable. FIG. 7 shows a message flow diagram 700 illustrating communications between a UE 115-*f* engaging in D2D discovery and a base station 105-*d*, in accordance with various aspects of the present disclosure. The UE and base station may be examples of the UEs 115 described in FIGS. 1, 2, 3, and/or 4 and the base stations 105 described in FIGS. 1 and/or 2.

Once the UE 115-*f* is in a connected mode 705 with base station 105-*d*, the UE 115-*f* and base station 105-*d* are mutually authenticated and thus communications exchanged between the two entities during this connected mode 705 may be secure. In this method, the UE 115-*f* utilizes additional messages that may already be necessary to engage in D2D communications. For example, the UE 115-*f* may transmit a dedicated RRC message 710 to the base station 105-*d* in order to request D2D resources. D2D resources may be allocated by base stations in accordance to either a Type 1 (common or device-controlled) resource allocation or a Type 2 (dedicated or network-controlled) resource allocation. Discovery resources that are device-controlled or Type 1 are not specific to any given UE and instead represent a pool of discovery resources from which more than one UE may autonomously select a resource to use for D2D discovery. Type 2 or network-controlled resources are uniquely allocated to individual UEs.

Therefore, when the UE 115-*f* is using a Type 2 allocation, the UE 115-*f* may send an RRC request 710 to the base station 105-*d* to receive its specific resource allocation. The base station 105-*d* may, in response to the RRC request 710, return an RRC response 715 to the UE 115-*f*. The RRC response 715 may, in the case of a Type 2 allocation, include an allocation of resources for D2D communication. In addition, however, the RRC response 715 may also include the necessary timing variable.

When the UE 115-*f* is using a Type 1 allocation of D2D resources, the UE 115-*f* may not be required to obtain a specific resource allocation from the base station 105-*d*. Nevertheless, in this method, the UE 115-*f* still sends an RRC request 710 to the base station 105-*d*. The base station 105-*d* may respond with the RRC response 715. However, because no resource allocation is required from the base station 105-*d*, the RRC response 715 may not include a resource allocation, but instead may only include the necessary timing variable.

Thus, regardless of whether the UE 115-*f* is using a Type 1 or a Type 2 allocation of D2D resources, the UE 115-*f* may send an RRC request 710 to the base station 105-*d*. In either case, the base station 105-*d* will send an RRC response 715 to the UE 115-*f*, with the RRC response 715 including the necessary timing variable. An example of the RRC request 710 that may be sent by the UE 115-*f* is an RRCProSeResourceAllocationRequest. An example of the RRC response 715 that may be received is RRCProSeResourceAllocation. Once the UE 115-*e* receives the timing variable via the RRC response 715, the UE 115-*f* may synchronize its own local timing variable to the received timing variable (step 720).

Figure 8:
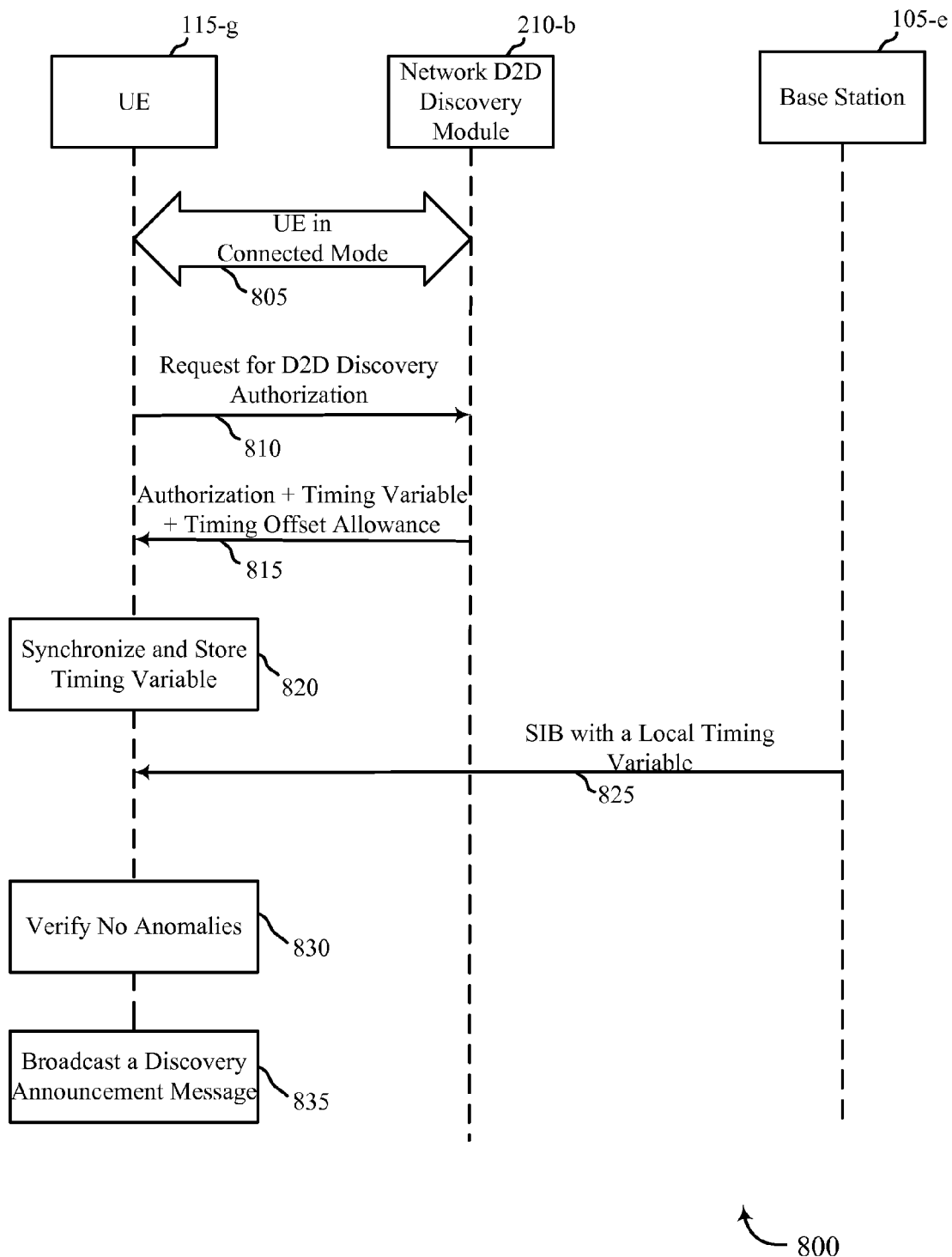
FIG. 8 shows a message flow diagram illustrating communications between a UE engaging in D2D discovery, a ProSe function, and a base station, in accordance with various aspects of the present disclosure.

An additional method of securely obtaining the timing variable is illustrated in FIG. 8, which shows a message flow diagram 800 illustrating communications between a UE 115-*g* engaging in D2D discovery, a network D2D discovery module 210-*b* and a base station 105-*e*, in accordance with various aspects of the present disclosure. The UE may be an example of the UEs 115 described in FIGS. 1, 2, 3, and/or 4. The base station may be an example of the base stations 105 described in FIGS. 1 and/or 2. The network D2D discovery module 210-*b* may be an example of the network D2D discovery module 210 and/or 210-*a* described with reference to FIGS. 2 and/or 3.

In this scenario, timing variable information is initially obtained not from the base station 105-*e*, but instead from the network D2D discovery module 210-*c*. This occurs when the UE 115-*g* is seeking from the network D2D discovery module 210-*c* authorization to participate in D2D communications. In order to do so, the UE 115-*g* enters into a connected mode 805 with the network D2D discovery module 210-*c*. The UE 115-*g* then submits a request 810 to the network D2D discovery module 210-*c* for D2D discovery authorization. The network D2D discovery module 210-*b* responds with response 815, which may include the authorization, as well as the needed timing variable. The UE 115-*g* may then synchronize the received timing variable (step 820).

The response 815 may also include a timing offset allowance. Because communications between the UE 115-*g* and the network D2D discovery module 210-*c* may be subject to various network delays, the timing offset allowance is included with the timing variable in order to indicate a maximum timing offset that may be used to prevent a replay attack described above. The timing offset allowance enables the UE 115-*g* to evaluate the accuracy of a later received timing variable, as explained below.

After storing and synchronizing the timing variable received from the network D2D discovery module 210-*b* via the message 815 (step 820), the UE 115-*g* may detect local timing variables in broadcast SIBs. For example, a base station 105-*e* may broadcast a SIB broadcast message 825 that includes a timing variable. The UE 115-*g* may then compare the timing variable (as previously synchronized with the timing variable provided by the network D2D discovery module 210-*b*) with the local timing variable provided in the broadcast SIB, thus identifying any anomalies (block 830). If the two timing variables are within the allowable offset as specified by the timing offset allowance, then the UE 115-*g* may assume that the broadcast SIB is authentic and the UE 115-*g* may store the local timing variable included with the broadcast SIB (block 835). If the difference between the two timing variables is greater than the offset allowed by the timing offset allowance, then the UE 115-*g* may tag this as an anomaly, and may continue to use the stored timing variable, may notify the network D2D discovery module 210-*b*, and/or may seek to obtain an updated timing variable using one of the different methods described above.

The timing offset allowance may also be used by a network D2D discovery module 210 during verification of a MIC (as described with reference to FIG. 3). Thus, when a network D2D discovery module 210 validates a MIC, the timing offset allowance may be used to define an acceptable difference between the timing variable used to generate the MIC and the timing variable transmitted by a monitoring UE.

While the timing variable module 430 may perform functions related to the timing variable using any of the methods described above with reference to FIGS. 5, 6, 7 and/or 8, the MIC module 425 (of FIG. 4) uses the timing variable to generate and/or validate a MIC.

Returning again to FIG. 4, MIC module 425 generates a MIC based on the timing variable at the time that the UE 115 is ready to broadcast the MIC (via, for example, message 320 of FIG. 3). For example, the MIC module 425 may obtain an estimated message transmission time from, for example, the transmitter module 420. The transmission time estimation may be based on a D2D discovery slot, the available D2D discovery resources allocated by the network, and the UE's timing variable. As an example, the discovery slot may be set by the network for every ten seconds, and the D2D discovery message may only be sent within certain radio frames with certain radio resources. Thus, the transmitter module 420 may consider these factors in addition to its current status (for example, the number of D2D discovery messages in its queue, transmission opportunities based on control algorithms, any estimated delay in preparing the message for transmission, etc.) in determining an estimated time of transmission. The transmitter module 420 may then provide an estimated time when the MIC message could be sent over the air and then provide that estimated time to the MIC module 425. The MIC module 425 may then use the estimated time in its generation of a MIC.

If the apparatus 405 is a monitoring UE, the MIC module 425 may receive a MIC and timestamp the received message using the UE's timing variable. The apparatus 405 then passes the received MIC, the received D2D discovery application code, and the timestamp based on the timing variable to a network D2D discovery module 210.

Alternatively, the monitoring UE may include in its message to the network D2D discovery module 210 a time delta representing the elapsed time between when the monitoring UE receives the MIC and when the monitoring UE transmits the MIC to the network D2D discovery module 210. In this case, the network D2D discovery module 210 may use the time delta to determine the timing variable value when the MIC was received.

Thus, the D2D discovery module 415 may be used in both an announcing and a monitoring UE to both receive timing variables and generate and/or forward the MIC. Additionally, the apparatus 405 may use the D2D discovery module 415 to forward the timing variables to other UEs, such as out-of-coverage UEs (for example, UE 115-*b*-4 of FIG. 2).

Figure 9:
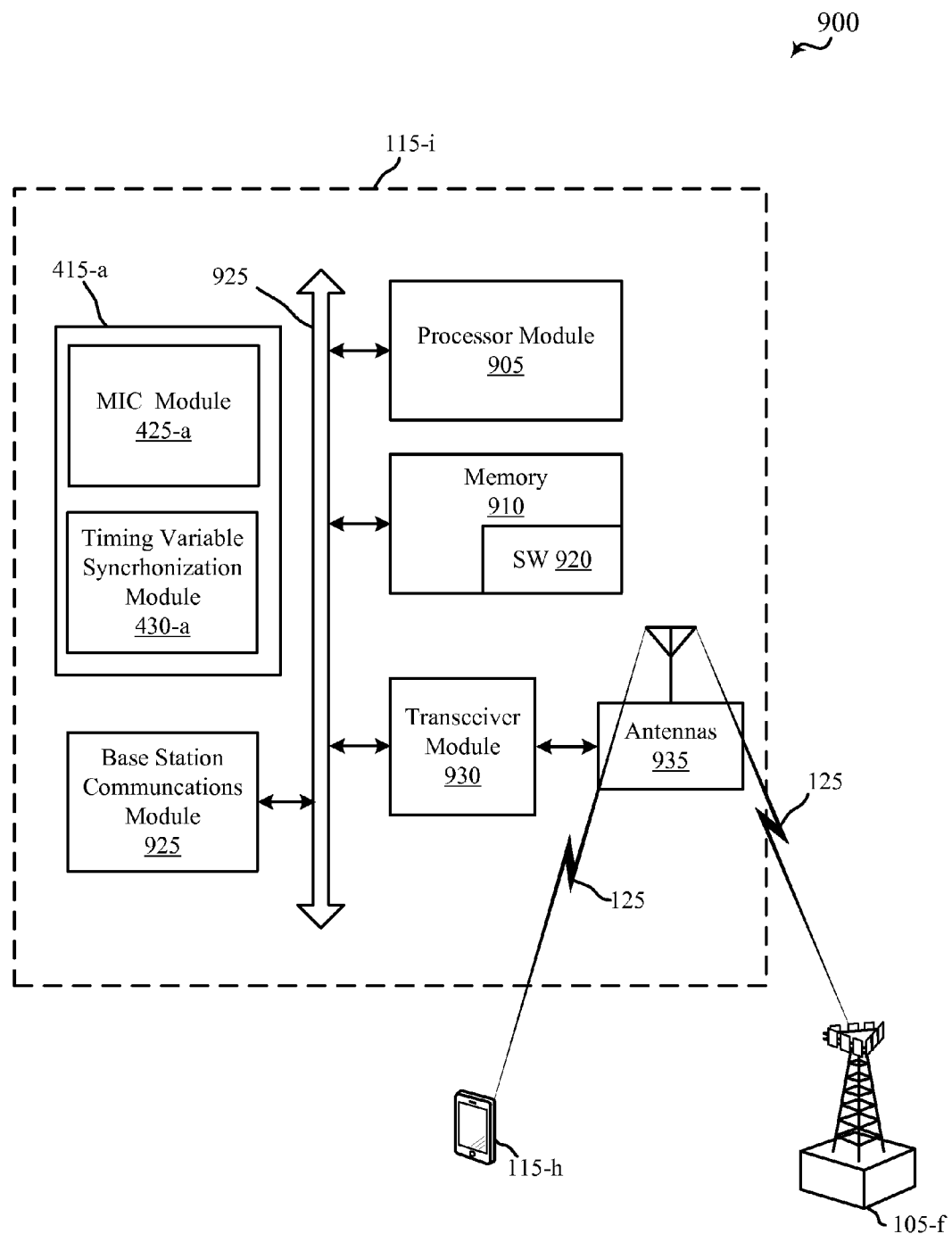
FIG. 9 shows a block diagram of a UE for use in wireless communication, in accordance with various aspects of the present disclosure.

FIG. 9 shows a block diagram 900 of a UE 115-*i* for use in wireless communication, in accordance with various aspects of the present disclosure. The UE 115-*i* may have various configurations and may be included or be part of a personal computer (e.g., a laptop computer, netbook computer, tablet computer, etc.), a cellular telephone, a smart phone, a PDA, a digital video recorder (DVR), an internet appliance, a gaming console, an e-reader, etc. The UE 115-*i* may, in some examples, have an internal power supply (not shown), such as a small battery, to facilitate mobile operation. In some examples, the UE 115-*i* may be an example of one or more aspects of one of the UEs 115 or apparatus 405 described with reference to FIGS. 1, 2, 3, 4, 5, 6, 7 and/or 8. The UE 115-*i* may be configured to implement at least some of the features and functions described with reference to FIGS. 1, 2, 3, 4, 5, 6, 7 and/or 8.

The UE 115-*i* may include a UE processor module 905, a UE memory module 910, at least one UE transceiver module (represented by UE transceiver module(s) 930), at least one UE antenna (represented by UE antenna(s) 935), or a D2D discovery module 415-*a*. Each of these components may be in communication with each other, directly or indirectly, over one or more UE buses 925. The UE 115-*i* may also include base station communications module 925 which may perform operations related to communications with one or more base stations.

The UE memory module 910 may include random access memory (RAM) or read-only memory (ROM). The UE memory module 910 may store computer-readable, computer-executable UE software (SW) code 920 containing instructions that are configured to, when executed, cause the UE processor module 905 to perform various functions described herein for communicating, for example, D2D discovery-related messages. Alternatively, the UE software code 920 may not be directly executable by the UE processor module 905 but be configured to cause the UE 115-*i* (e.g., when compiled and executed) to perform various of the functions described herein.

The UE processor module 905 may include an intelligent hardware device, e.g., a central processing unit (CPU) such as those made by Intel® Corporation or AMD®, a microcontroller, an application-specific integrated circuit (ASIC), etc. The UE processor module 905 may process information received through the UE transceiver module(s) 930 or information to be sent to the UE transceiver module(s) 930 for transmission through the UE antenna(s) 935. The UE processor module 905 may handle, alone or in connection with the D2D discovery module 415-*a*, various aspects of transmitting, receiving and managing D2D discovery communications.

The UE transceiver module(s) 630 may include a modem configured to modulate packets and provide the modulated packets to the UE antenna(s) 935 for transmission, and to demodulate packets received from the UE antenna(s) 935. The UE transceiver module(s) 930 may, in some examples, be implemented as one or more transmitter modules and one or more separate receiver modules. The UE transceiver module(s) 930 may support D2D discovery-related communications. The UE transceiver module(s) 930 may be configured to communicate bi-directionally, via the UE antenna(s) 935 and communication link 125, with, for example, base station 105-f which may be one or more of the base stations 105 described with reference to FIGS. 1, 2, 5, 6, 7, and/or 8. The UE transceiver module(s) 930 may also be configured to communicate bi-directionally, via the UE antenna(s) 935 and communication link 125, with, for example, UE 115-h which may be one or more of the UEs 115 described with reference to FIGS. 1, 2, 3, 5, 6, 7, and/or 8 or apparatus 405 described with reference to FIG. 4. While the UE 115-i may include a single antenna, there may be examples in which the UE 115-i may include multiple UE antennas 935.

The D2D discovery module 415-a may be configured to perform or control some or all of the features or functions described with reference to FIGS. 1, 2, 3, 4, 5, 6, 7, and/or 8 related to D2D discovery. For example, the D2D discovery module 415-a may be configured to support transmission and receipt of D2D discovery messages as well as management of the D2D discovery enabled by the D2D discovery messages. In some examples, and by way of example, the D2D discovery module 415-a may be an example of one or more aspects of the D2D discovery module 415 described with reference to FIGS. 4, 5, 6, 7, and/or 8. The D2D discovery module 415-a may include a MIC module 425-a (which may be an example of the MIC module 425 of FIG. 4), and a timing variable module 430-a (which may be an example of the timing variable module 430 of FIG. 4). The D2D discovery module 415-a, or portions of it, may include a processor, or some or all of the functions of the D2D discovery module 415-a may be performed by the UE processor module 905 or in connection with the UE processor module 905. Additionally, the D2D discovery module 415-a, or portions of it, may include a memory, or some or all of the functions of the D2D discovery module 415-a may use the UE memory module 910 or be used in connection with the UE memory module 910.

Figure 10:
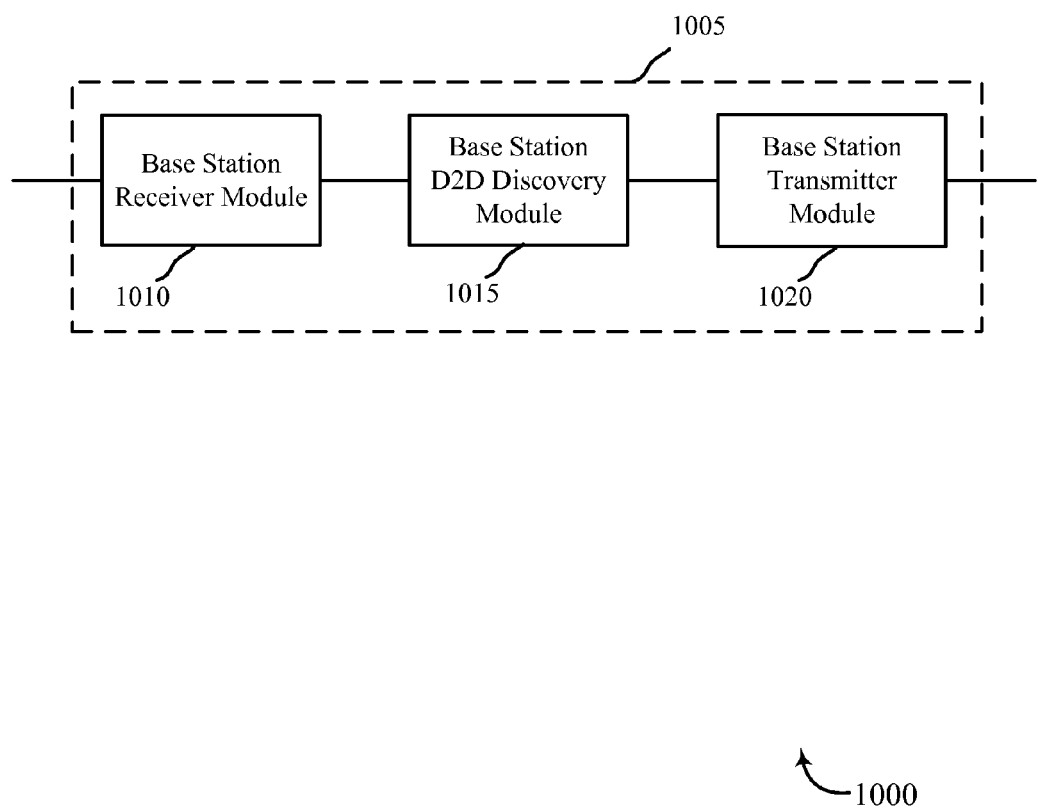
FIG. 10 shows a block diagram of an apparatus for use in wireless communication, in accordance with various aspects of the present disclosure.

FIG. 10 shows a block diagram 1000 of an apparatus 1005 for use in wireless communication, in accordance with various aspects of the present disclosure. In some examples, the apparatus 1005 may be an example of aspects of one or more of the base stations 105 described with reference to FIGS. 1, 2, 5, 6, 7, and/or 8. The apparatus 1005 may also be a processor. The apparatus 1005 may include a base station receiver module 1010, a base station D2D discovery module 1015, or a base station transmitter module 1020. Each of these components may be in communication with each other.

The components of the apparatus 1005 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the base station receiver module 1010 may include at least one RF receiver, such as at least one RF receiver operable to receive transmissions over a radio frequency spectrum. In some examples, the radio frequency spectrum may be used for LTE/LTE-A communications, as described, for example, with reference to FIG. 1, 2 or 7. The base station receiver module 1010 may be used to receive various types of data or control signals (i.e., transmissions) over one or more communication links of a wireless communication system, such as one or more communication links 125, 134 of the wireless communication system 100 described with reference to FIG. 1 or 2. Examples of the types of data or control signals received by the base station receiver module 1010 include the D2D discovery communications described with reference to FIG. 5, 6, 7 or 8.

In some examples, the base station transmitter module 1020 may include at least one RF transmitter, such as at least one RF transmitter operable to transmit D2D discovery communications. The base station transmitter module 1020 may be used to transmit various types of data or control signals (i.e., transmissions) over one or more communication links of a wireless communications system, such as one or more communication links 125, 134 of the wireless communications system 100 described with reference to FIG. 1 or 2. Examples of the types of data or control signals transmitted by the base station transmitter module 1020 include the D2D discovery communications described with reference to FIGS. 5, 6, 7, and/or 8.

In some examples, the base station D2D discovery module 1015 may be used to manage the receipt of D2D discovery requests 710 and the transmission of D2D discovery messages 515, 520, 615, 715 or 825 (see FIG. 5, 6, 7 or 8) via the base station receiver module 1010 and/or the base station transmitter module 1020. Managing the receipt and transmission of D2D discovery communications may include transmitting to a UE a timing variable while the UE is in a connected mode with the apparatus 1005. For example, with reference to FIG. 5, the base station D2D discovery module 1015 may manage the communication of an SIB in a message 520. In an additional example, with reference to FIG. 6, the base station D2D discovery module 1015 may manage the communication of an RRC message 615 to a connected UE 115-e, wherein the RRC message includes an SIB with a timing variable. With reference to FIG. 7, the base station D2D discovery module 1015 may manage the receipt of an RRC request 710 for resources and, in response to the request 710, responding with an RRC response 715 that includes a timing variable. With reference to FIG. 8, the apparatus 1005 may broadcast an SIB having a timing variable in an SIB message 825.

Figure 11:
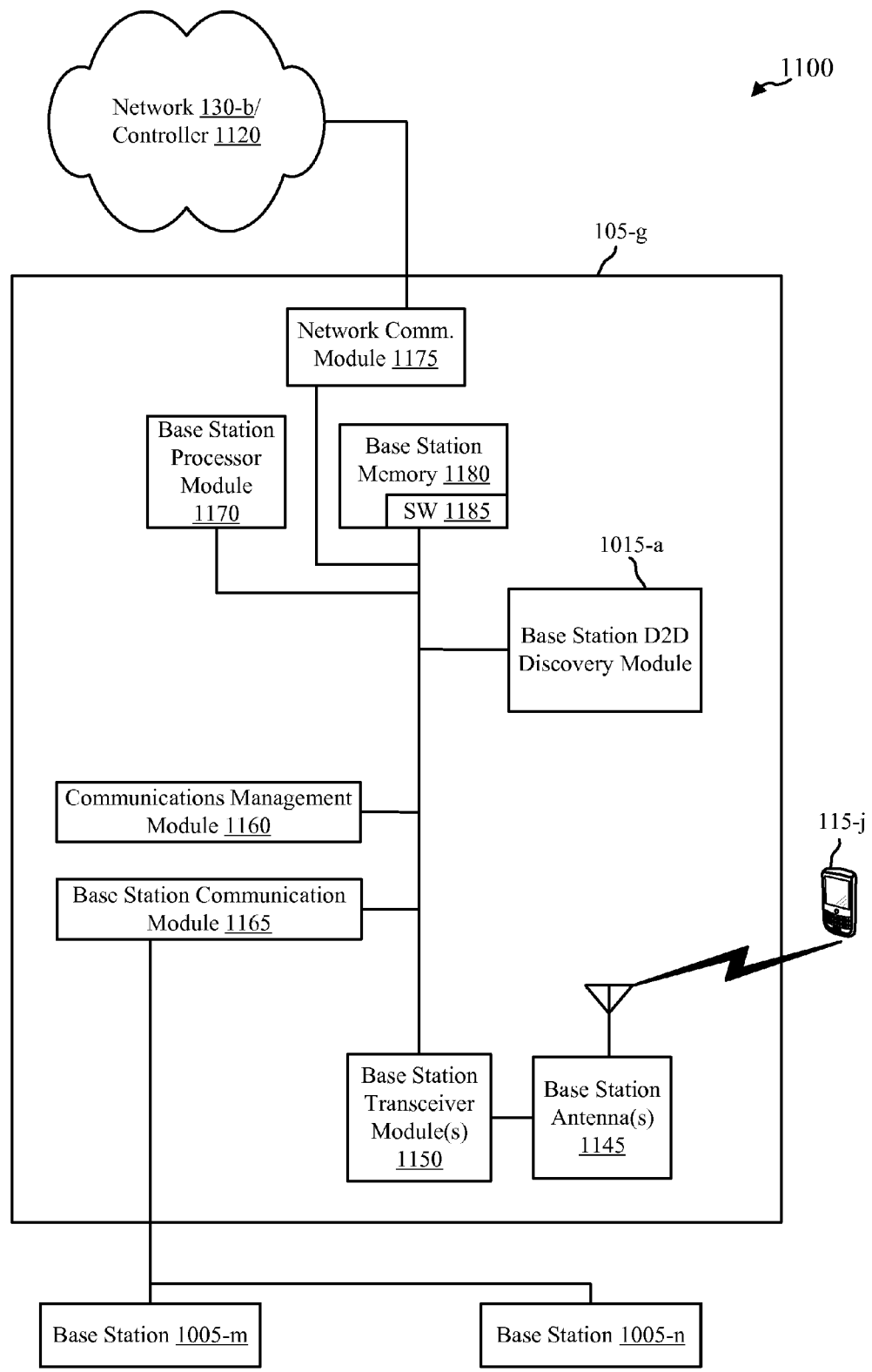
FIG. 11 shows a block diagram of a communications system configured for use in receiving and transmitting D2D discovery communications, in accordance with various aspects of the present disclosure.

FIG. 11 shows a block diagram of a communications system 1100 that may be configured for use in receiving and transmitting D2D discovery communications, in accordance with various aspects of the present disclosure. The system 1100 may be an example of aspects of the wireless communications systems 100 and/or 200 described in FIGS. 1 and/or 2. System 1100 may include a base station 105-g. A base station 1005-a may include base station antenna(s) 1145, a base station transceiver module 1150, base station memory 1180, and a base station processor module 1170, which each may be in communication, directly or indirectly, with each other (e.g., over one or more buses). The base station transceiver module 1150 may be configured to communicate bi-directionally, via the base station antenna(s) 1145, with a UE 115-j, which may be an example of the UE 115 of FIGS. 1, 2, 3, 5, 6, 7, and/or 8 and/or apparatus 405 of FIG. 4. The base station transceiver module 1150 (and/or other components of the base station 105-*g*) may also be configured to communicate bi-directionally with one or more networks. In some cases, the base station 105-*g* may communicate with the core network 130-*b* and/or controller 1120 through network communications module 1175. Base station 105-*g* may be an example of the base stations 105 of FIGS. 1, 2, 5, 6, 7, and/or 8 and/or the apparatus 1005 of FIG. 10, and can also be an eNodeB base station, a Home eNodeB base station, a NodeB base station, and/or a Home NodeB base station. Controller 1120 may be integrated into base station 1005-*a* in some cases, such as with an eNodeB base station.

Base station 105-*g* may also communicate with other base stations 105, such as base station 1005-*m* and base station 1005-*n*. Each of the base stations 105 may communicate with the UE 115-*j* using different wireless communications technologies, such as different Radio Access Technologies. In some cases, base station 105-*g* may communicate with other base stations such as 1005-*m* and/or 1005-*n* utilizing base station communication module 1165. In some examples, base station communication module 1165 may provide an X2 interface within an LTE wireless communication technology to provide communication between some of the base stations 105. In some examples, base station 105-*g* may communicate with other base stations through controller 1120 and/or core network 130-*b*.

The base station memory 1180 may include RAM and ROM. The base station memory 1180 may also store computer-readable, computer-executable software code 1185 containing instructions that are configured to, when executed, cause the base station processor module 1170 to perform various functions described herein (e.g., receiving and transmitting D2D discovery communications). Alternatively, the software code 1185 may not be directly executable by the base station processor module 1170 but be configured to cause the computer, e.g., when compiled and executed, to perform functions described herein.

The base station processor module 1170 may include an intelligent hardware device, e.g., a CPU, a microcontroller, an ASIC, etc. The base station processor module 1170 may include a speech encoder (not shown) configured to receive audio via a microphone, convert the audio into packets (e.g., 30 milliseconds in length, etc.) representative of the received audio, provide the audio packets to the base station transceiver module 1150, and provide indications of whether a user is speaking. Alternatively, an encoder may only provide packets to the base station transceiver module 1150, with the provision or withholding/suppression of the packet itself providing the indication of whether a user is speaking.

The base station transceiver module 1150 may include a modem configured to modulate packets and provide the modulated packets to the base station antenna(s) 1145 for transmission, and to demodulate packets received from the base station antenna(s) 1145. While some examples of the base station 105-*g* may include a single base station antenna 1145, the base station 105-*g* preferably includes multiple base station antennas 1145 for multiple links which may support carrier aggregation. For example, one or more links may be used to support macro communications with the UE 115-*j*.

According to the architecture of FIG. 11, the base station 105-*g* may further include a communications management module 1160. The communications management module 1160 may manage communications with other base stations 105. By way of example, the communications management module 1160 may be a component of the base station 105-*g* in communication with some or all of the other components of the base station 105-*g* via a bus. Alternatively, functionality of the communications management module 1160 may be implemented as a component of the base station transceiver module 1150, as a computer program product, and/or as one or more controller elements of the base station processor module 1170.

The components for base station 105-*g* may be configured to implement aspects discussed above with respect to apparatus 1005 of FIG. 10 and may not be repeated here for the sake of brevity. For example, the base station 105-*g* may include a base station D2D discovery module 1015-*a*. Base station D2D discovery module 1015-*a* may be an example of the base station D2D discovery module 1015 of FIG. 10. The base station D2D discovery module 1015-*a* may be configured to perform or control some or all of the features or functions described with reference to FIGS. 1, 2, 5, 6, 7, 8, and/or 10 related to D2D discovery. For example, the base station D2D discovery module 1015-*a* may be configured to support receipt and transmission of D2D discovery communications. In particular, the base station D2D discovery module 1015-*a* may be configured to support transmission of a timing variable to a UE (for example, UE 115-*j*) when the UE is in a connected mode with the base station 105-*g*. The base station D2D discovery module 1015-*a*, or portions of it, may include a processor, or some or all of the functions of the base station D2D discovery module 1015-*a* may be performed by the base station processor module 1170 or in connection with the base station processor module 1170. Additionally, the base station D2D discovery module 1015-*a*, or portions of it, may include a memory, or some or all of the functions of the base station D2D discovery module 1015-*a* may use the base station memory 1180 or be used in connection with the base station memory 1180.

Figure 12:
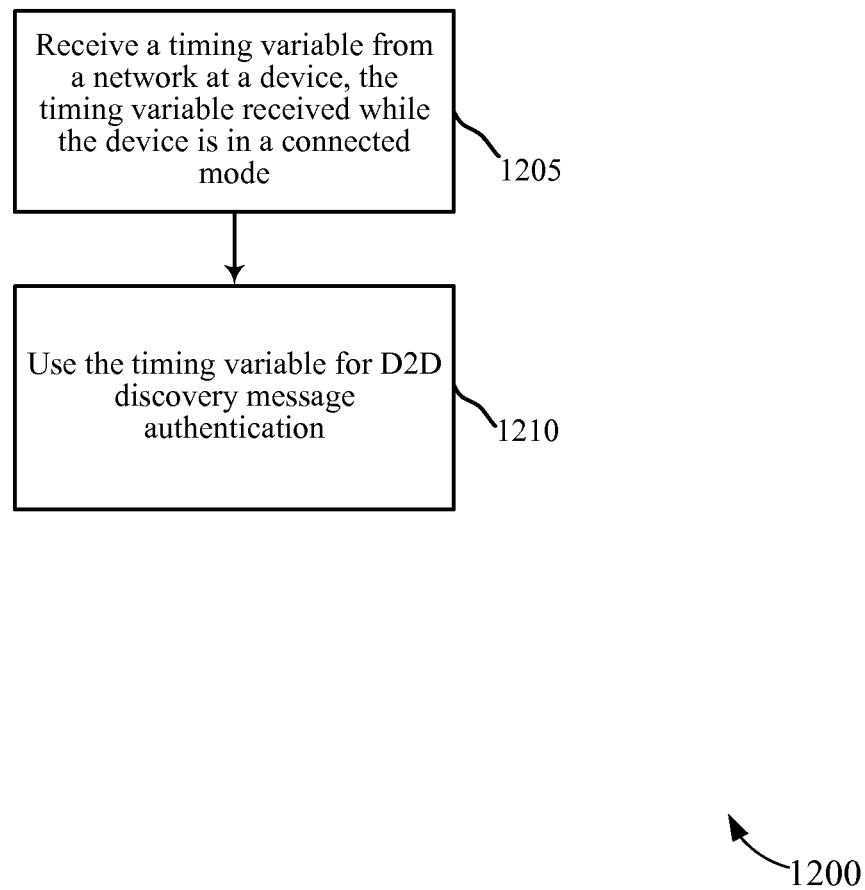
FIG. 12 shows a flow chart illustrating an example of a method for wireless communications, in accordance with various aspects of the present disclosure.

FIG. 12 is a flow chart illustrating an example of a method 1200 for wireless communication, in accordance with various aspects of the present disclosure. For clarity, the method 1200 is described below with reference to aspects of one or more of the UEs 115 described with reference to FIGS. 1, 2, 3, 5, 6, 7, 8, and/or 9, or aspects of one or more of the apparatus 405 described with reference to FIG. 4. In some examples, a UE such as one of the UEs 115 or an apparatus such as the apparatus 405 may execute one or more sets of codes to control the functional elements of the UE or apparatus to perform the functions described below.

At block 1205, the method 1200 may include receiving a timing variable from a network at a device, the timing variable being received while the device is in a connected mode. The timing variable could be received in the form of a message 520, 615, 715, 815, and/or 825, as described above with reference to FIGS. 5, 6, 7, and/or 8.

At block 1210, the method 1200 may include using the timing variable for D2D discovery message authentication. For example, the received timing variable may be either used to generate a MIC or to verify a MIC, as described above with reference to FIG. 3.

In some examples, the operations at blocks 1205 or 1210 may be performed using the D2D discovery module 415 described with reference to FIGS. 4 and/or 9. Nevertheless, it should be noted that the method 1200 is just one implementation and that the operations of the method 1200 may be rearranged or otherwise modified such that other implementations are possible.

Figure 13:
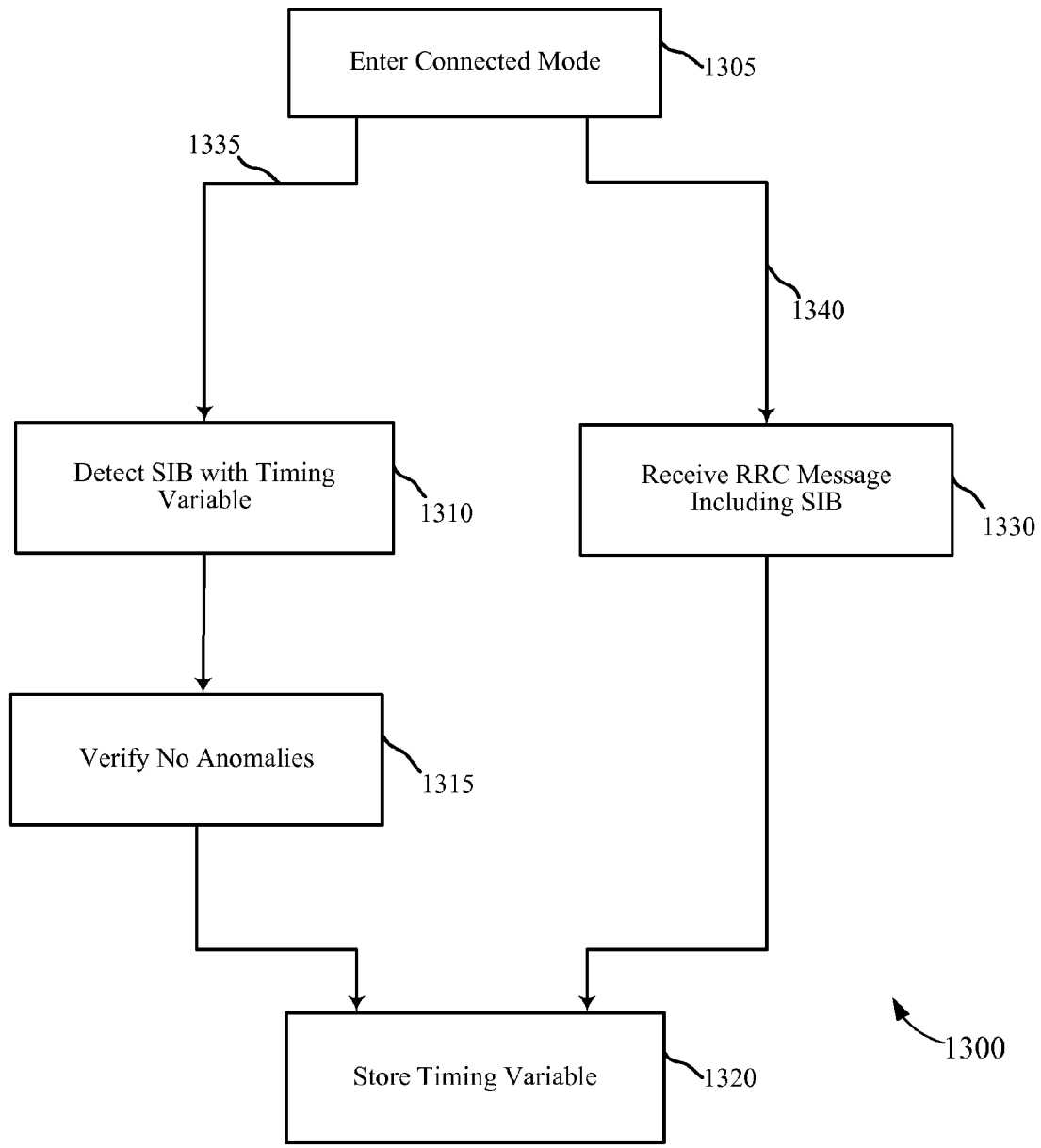
FIG. 13 shows a flow chart illustrating an example of a method for wireless communications, in accordance with various aspects of the present disclosure.

FIG. 13 is a flow chart illustrating an example of a method 1300 for wireless communication, in accordance with various aspects of the present disclosure. For clarity, the method 1300 is described below with reference to aspects of one or more of the UEs 115 described with reference to FIGS. 1, 2, 3, 5, 6, and/or 9, respectively, or aspects of one or more of the apparatus 405 described with reference to FIG. 4. In some examples, a UE such as one of the UEs 115 or an apparatus such as the apparatus 405 may execute one or more sets of codes to control the functional elements of the UE or apparatus to perform the functions described below.

Figure 14:
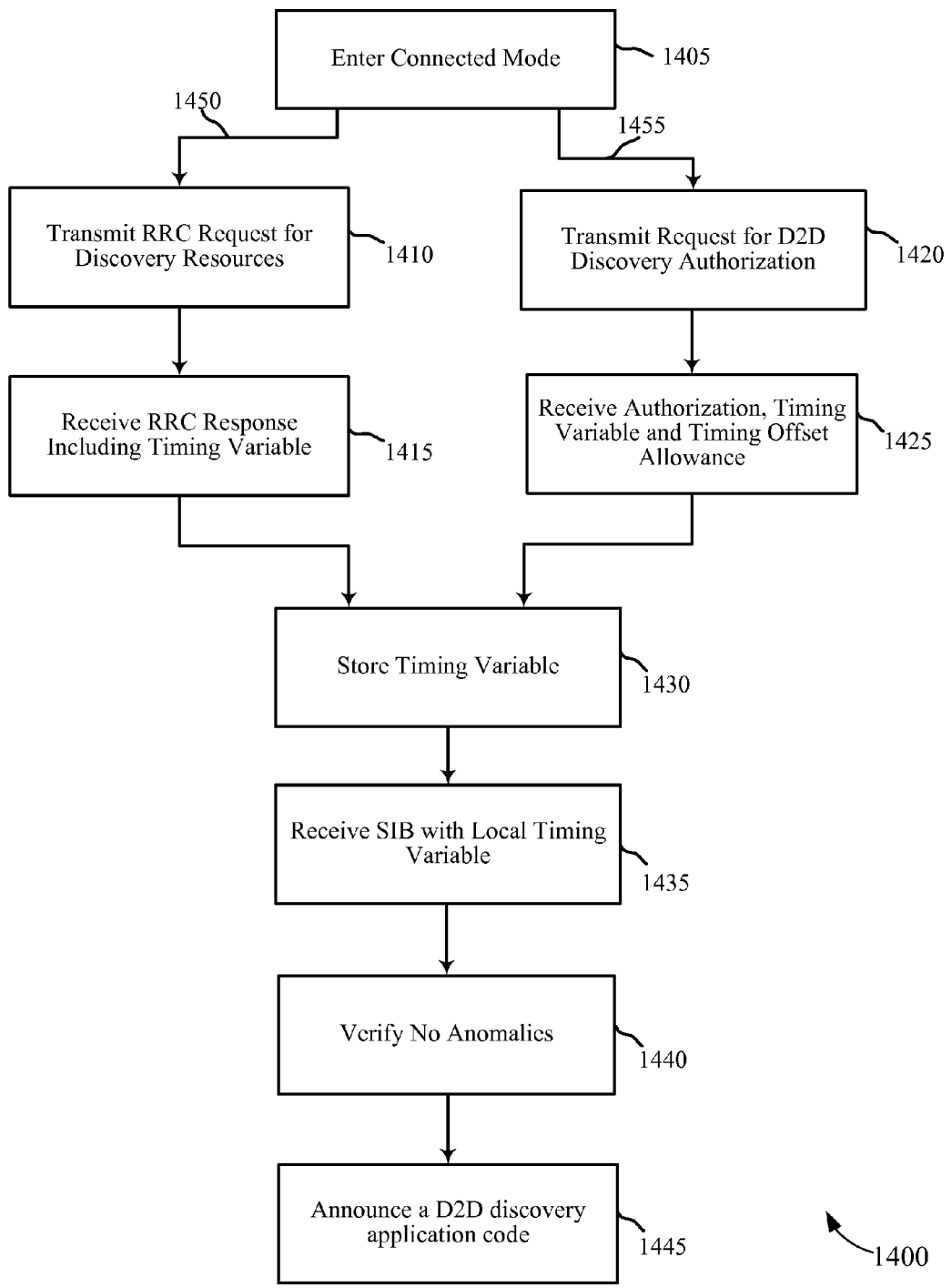
FIG. 14 shows a flow chart illustrating an example of a method for wireless communications, in accordance with various aspects of the present disclosure.

The method 1300 illustrates two alternative flow paths represented by paths 1335 and 1340. At block 1305, the method 1300 may include entering into a connected mode. As explained above, a UE may benefit from receiving a timing variable while the UE is in a connected mode such as an RRC_CONNECTED mode wherein the UE and the connected entity are mutually authenticated. Therefore, at block 1305, the UE enters into a connected mode, as is illustrated by connected modes 505 and/or 605 in FIGS. 5 and/or 6, for example. The UE may then obtain the needed timing variable using one of flow paths 1335, 1340. Additional alternative flow paths are illustrated in FIG. 14, described below.

Following flow path 1335, at block 1310, the method 1300 may comprise detecting an SIB having the needed timing variable. The detection of the SIB is in response to the receipt of the command to do so. The SIB is detected while the UE is still in connected mode. An example of this SIB detection is illustrated in FIG. 5 by message 520.

At block 1315, the method 1300 may include a step of verifying that there are no anomalies relating to the received timing variable. An example of this step is illustrated in FIG. 5 by step 525. Verification that no anomalies have occurred may be necessary in certain situations where a rogue base station is active. For example, a rogue base station could attempt to inject a timing related SIB in the same broadcast slot scheduled by the legitimate base station. Thus, in this situation, the UE may observe multiple SIBs of the same type being broadcast at the same time. Alternatively, the multiple SIBs may collide such that the UE receives no SIB. Further, a UE might only receive an SIB broadcast by the rogue base station, wherein the UE determines that there is a wide difference between the received timing variable (from the illegitimate SIB) and the UE's locally-stored timing variable. In each of these cases, the UE may determine that an anomaly has occurred and that a timing variable should be obtained using a different method.

If no anomalies are deemed to occur, then the received timing variable is stored at the UE (at block 1320). A similar step is described in FIG. 5 at step 530.

If an alternative path for obtaining the timing variable is used, such as path 1340, method 1300 includes a block 1330. At block 1330, method 1300 includes receiving an RRC message that includes an SIB having the needed timing variable. An example of the received RRC message may include message 615, as illustrated in FIG. 6. The RRC message may be received without the UE needing to specifically request the message, as the transmitting base station can determine independently that the UE is participating in D2D discovery communications. Once the UE receives the RRC message with its timing variable, the UE is able to store the timing variable, at block 1320.

It should be noted that the method 1300 is just one implementation and that the operations of the method 1300 may be rearranged or otherwise modified such that other implementations are possible. As a specific example, not every operation illustrated in the method 1300 need be performed, and many operations may be performed in different orders than those illustrated in FIG. 13.

FIG. 14 is a flow chart illustrating an example of a method 1400 for wireless communication, in accordance with various aspects of the present disclosure. For clarity, the method 1400 is described below with reference to aspects of one or more of the UEs 115 described with reference to FIGS. 1, 2, 3, 7, 8, and/or 9, respectively, or aspects of one or more of the apparatus 405 described with reference to FIG. 4. In some examples, a UE such as one of the UEs 115 or an apparatus such as the apparatus 405 may execute one or more sets of codes to control the functional elements of the UE or apparatus to perform the functions described below.

The method 1400 illustrates two alternative flow paths represented by paths 1450 and 1455. At block 1405, the method 1400 may include entering into a connected mode. As explained above, a UE may benefit from receiving a timing variable while the UE is in a connected mode such as an RRC_CONNECTED mode wherein the UE and the connected entity are mutually authenticated. Therefore, at block 1405, the UE enters into a connected mode, as is illustrated by connected modes 705 and/or 805 in FIGS. 7 and/or 8, for example. The UE may then obtain the needed timing variable using one of flow paths 1450, 1455. Additional alternative flow paths are illustrated in FIG. 13, described above.

Following flow path 1450, at block 1410, the method 1400 may comprise transmitting an RRC request for discovery resources. The RRC request may be transmitted from a UE to a base station. The RRC request may be transmitted regardless of whether the UE is using a Type 1 (or device-controlled) resource allocation or a Type 2 (or network controlled) resource allocation. Discovery resources that are device-controlled or Type 1 are not specific to any given UE and instead represent a pool of discovery resources from which more than one UE may autonomously select a resource to use for D2D discovery. Type 2 or network controlled resources are uniquely allocated to individual UEs. Therefore, when the UE is using a Type 2 allocation, the UE is required to send an RRC request to the base station to receive its specific resource allocation. When the UE is using a Type 1 allocation of D2D resources, the UE is not required to obtain a specific resource allocation from the base station. Nevertheless, in method 1400, the UE still sends an RRC request regardless of whether the UE is using Type 1 or Type 2 resource allocation. An example of the transmitted RRC request is the RRC request 710 of FIG. 7.

At block 1415, the UE receives an RRC response that includes the timing variable. If the UE is using Type 2 resource allocation, the received RRC response may include both an allocation of resources and the timing variable. If the UE is using Type 1 resource allocation, the received RRC response may not include an actual resource allocation, but may only include the timing variable. An example of the received RRC response is the RRC response 715 of FIG. 7.

Once received, the timing variable is stored at the UE (at block 1430). A similar step is described in FIG. 7 at block 720.

If an alternative path for obtaining the timing variable is used, such as path 1455, the method 1400 may include blocks 1420, 1425, 1430, 1435, 1440, and 1445. At block 1420, the method 1400 includes transmitting a request for D2D discovery authorization. The transmitted request is transmitted from a UE to a network D2D discovery module such as a ProSe Function. An example of the transmitted request is the request 810 of FIG. 8.

At block 1425, the UE receives an authorization message from the network D2D discovery module. The received authorization message may also include a timing variable. The received authorization message may additionally include a timing offset allowance such as MAX_OFFSET.

An example of the received authorization message with timing variable and timing offset allowance is the message 815 of FIG. 8.

The timing variable received from the network D2D discovery module may be used by the UE to be compared with its own locally stored timing variable. Thus, at block 1430, the UE may store the received timing variable. An example of this step is illustrated at block 820 of FIG. 8. Additionally, if a timing offset allowance was also received, the timing offset allowance may be stored. The UE may use the received timing offset allowance to determine whether a difference between the received timing variable and the local timing variable is within the timing offset variable, as explained below and in connection with FIG. 8.

At block 1435, the UE may receive an SIB broadcast from a base station. The received SIB may include a local timing variable. An example of the SIB broadcast message received by the UE may include the message 825 of FIG. 8.

At block 1440, the UE verifies that no anomalies exist between the received timing variable (as received from the network D2D discovery module) and the local timing variable received as part of the SIB from a base station. In comparing the two timing variables, the UE uses the previously received timing offset allowance. If the two timing variables differ by an amount that is greater than the received timing offset allowance, then anomalies may exist and the UE may need to obtain an updated timing variable using a different method. If, however, the two timing variables differ by an amount that is less than the received timing offset allowance, then the UE may conclude that no anomalies exist. An example of the verification step is illustrated at block 830 of FIG. 8.

If no anomalies exist, then the UE may, at block 1445, start broadcasting a discovery announce message such as a ProSe App code as described with reference to FIG. 3. An example of the announcing step is illustrated at block 835 of FIG. 8.

It should be noted that the method 1400 is just one implementation and that the operations of the method 1400 may be rearranged or otherwise modified such that other implementations are possible. As a specific example, not every operation illustrated in the method 1400 need be performed, and many operations may be performed in different orders than those illustrated in FIG. 14.

Figure 15:
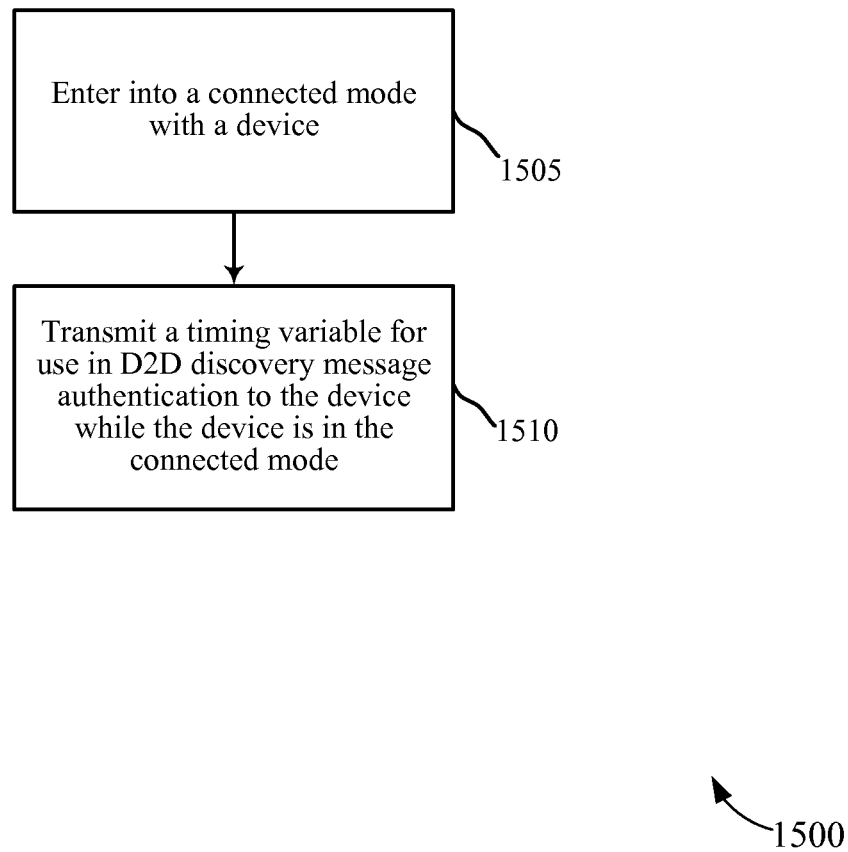
FIG. 15 shows a flow chart illustrating an example of a method for wireless communications, in accordance with various aspects of the present disclosure.

FIG. 15 is a flow chart illustrating an example of a method 1500 for wireless communication, in accordance with various aspects of the present disclosure. For clarity, the method 1500 is described below with reference to aspects of one or more of the base stations 105 described with reference to FIGS. 1, 2, 5, 6, 7, 8, and/or 11, or aspects of one or more of the apparatus 1005 described with reference to FIG. 10. In some examples, a base station such as one of the base stations 105 or an apparatus such as the apparatus 1005 may execute one or more sets of codes to control the functional elements of the base station or apparatus to perform the functions described below.

At block 1505, the method 1500 may include entering into a connected mode with a device. Connected mode, such as connected modes 505, 605, and/or 705 of FIGS. 5, 6, and/or 7, may ensure that both the base station and the connected UE are mutually authenticated.

At block 1510, the method 1500 may include transmitting a timing variable to the device while the device is in the connected mode. The timing variable could be transmitted in the form of a message 520, 615, and/or 715, as described above with reference to FIGS. 5, 6 and/or 7.

In some examples, the operations at blocks 1205 or 1210 may be performed using the base station D2D discovery module 1015 described with reference to FIGS. 10 and/or 11. Nevertheless, it should be noted that the method 1500 is just one implementation and that the operations of the method 1500 may be rearranged or otherwise modified such that other implementations are possible.

Figure 16:
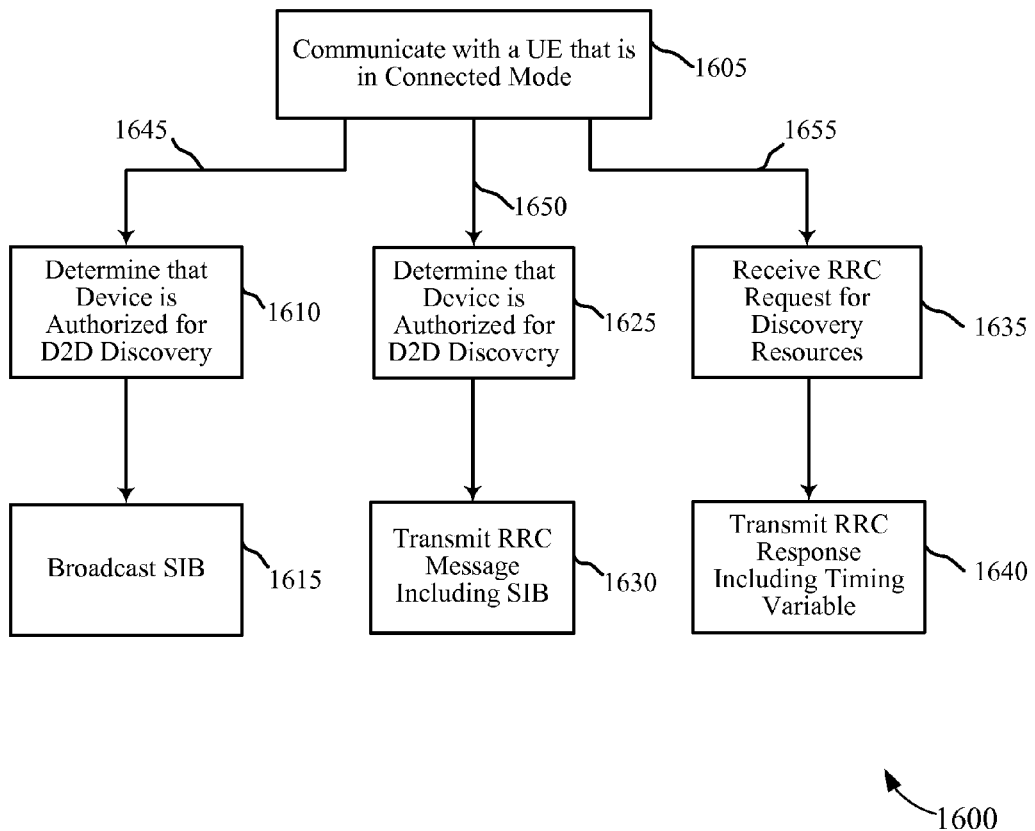
FIG. 16 shows a flow chart illustrating an example of a method for wireless communications, in accordance with FIG. 17 shows a flow chart illustrating an example of a method for wireless communications, in accordance with various aspects of the present disclosure.

FIG. 16 is a flow chart illustrating an example of a method 1600 for wireless communication, in accordance with various aspects of the present disclosure. For clarity, the method 1600 is described below with reference to aspects of one or more of the base stations 105 described with reference to FIGS. 1, 2, 5, 6, 7, and/or 11, or aspects of one or more of the apparatus 1005 described with reference to FIG. 10. In some examples, a base station such as one of the base stations 105 or an apparatus such as the apparatus 1005 may execute one or more sets of codes to control the functional elements of the base station or apparatus to perform the functions described below.

The method 1600 illustrates three alternative flow paths represented by paths 1645, 1650 and 1655. At block 1605, the method 1600 may include entering into communications with a UE that is in a connected mode. As explained above, a UE may benefit from receiving a timing variable while the UE is in a connected mode such as an RRC_CONNECTED mode wherein the UE and a base station are mutually authenticated. Therefore, at block 1605, the base station is in communication with a UE that is in a connected mode, as is illustrated by connected modes 505, 605, and/or 705 in FIGS. 5, 6, and/or 7, for example. The base station may then transmit the needed timing variable using one of flow paths 1645, 1650, 1655.

Following flow path 1645, at block 1610, the method 1600 may comprise determining that the connected UE is authorized for D2D discovery. For example, the base station may be able to determine if the connected UE has been authorized to participate in D2D discovery communications via receipt of an authorization from a network D2D discovery module. An example of this step is illustrated at block 510 in FIG. 5.

At block 1615, the method 1600 may include broadcasting the SIB that includes the timing variable. The broadcast SIB, such as SIB message 520 of FIG. 5, may be SIB16 or may be a D2D discovery-specific SIB. In this way, the receiving UE is enabled to receive the timing variable while the UE is in a connected mode with the base station.

Alternatively, flow path 1650 may be followed. In flow path 1650, at block 1625, the method 1600 may comprise determining that the connected UE is authorized for D2D discovery. For example, the base station may be able to determine if the connected UE has been authorized to participate in D2D discovery communications via receipt of an authorization from a network D2D discovery module. An example of this step is illustrated at block 610 in FIG. 6.

At block 1630, the method 1600 may include transmitting an RRC message that includes an SIB with the timing variable. Because the base station had already determined that the connected UE was authorized for D2D discovery, the base station may transmit the RRC message without waiting for a request from the connected UE. An example of the transmitted message may include RRC message 615 of FIG. 6.

Alternatively, flow path 1655 may be followed. In flow path 1655, at block 1635, the method 1600 may comprise receiving an RRC request for discovery resources, such as RRC request 710 of FIG. 7. The RRC request may be from a UE using either Type 1 (device-controlled) or Type 2 (network-controlled) resource allocations for D2D discovery.

At block 1640, the method 1600 may include transmitting an RRC response to the RRC request. If the connected UE is using Type 2 (network-controlled) resource allocation, the RRC response may include both the allocated resources as well as the timing variable. If the connected UE is using Type 1 (device-controlled) resource allocation, the RRC response need not include any resource allocation, but may instead only include the timing variable. In either case, the timing variable is included as part of the RRC response. An example of the RRC response may include RRC response 715 of FIG. 7.

It should be noted that the method 1600 is just one implementation and that the operations of the method 1600 may be rearranged or otherwise modified such that other implementations are possible. As a specific example, not every operation illustrated in the method 1600 need be performed, and many operations may be performed in different orders than those illustrated in FIG. 16.

Figure 17:
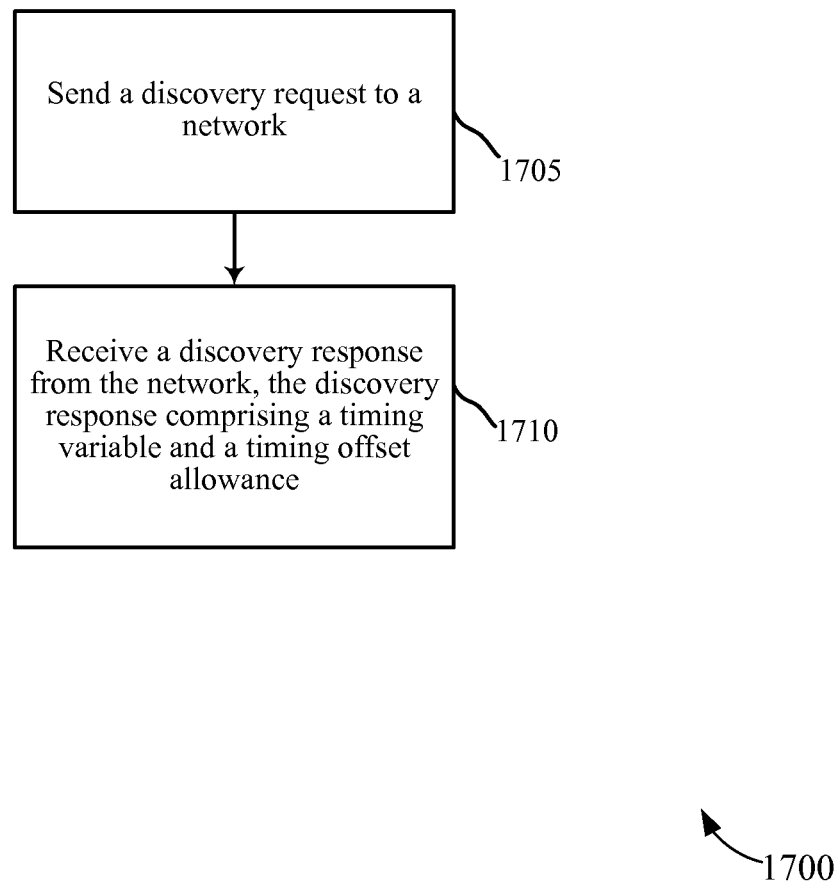

FIG. 17 is a flow chart illustrating an example of a method 1700 for wireless communication, in accordance with various aspects of the present disclosure. The method 1700 is described below with reference to aspects of one or more of the UEs 115 described with reference to FIGS. 1, 2, 3, 5, 6, and/or 9, respectively, or aspects of one or more of the apparatus 405 described with reference to FIG. 4. In some examples, a UE such as one of the UEs 115 or an apparatus such as the apparatus 405 may execute one or more sets of codes to control the functional elements of the UE or apparatus to perform the functions described below.

At block 1705, the method 1700 includes sending a discovery request to a ProSe function in a network to be allowed to announce a D2D discovery application code as described above with reference to FIG. 3. The discovery request may contain a ProSe application ID. The discovery request may be sent to a D2D discovery module such as a ProSe function in either HPLMN or VPMLN serving the UE. The operation(s) of block 1705 may be performed by the D2D discovery module 415 in conjunction with the transmitter module 420 described above with reference to FIG. 4.

At block 1710, the method 1700 includes receiving a discovery response from the network as described above with reference to FIG. 3. The discovery response may include a timing variable and a timing offset allowance. The operation(s) of block 1710 may be performed by the D2D discovery module 415 in conjunction with the receiver module 410 described above with reference to FIG. 4.

Figure 18:
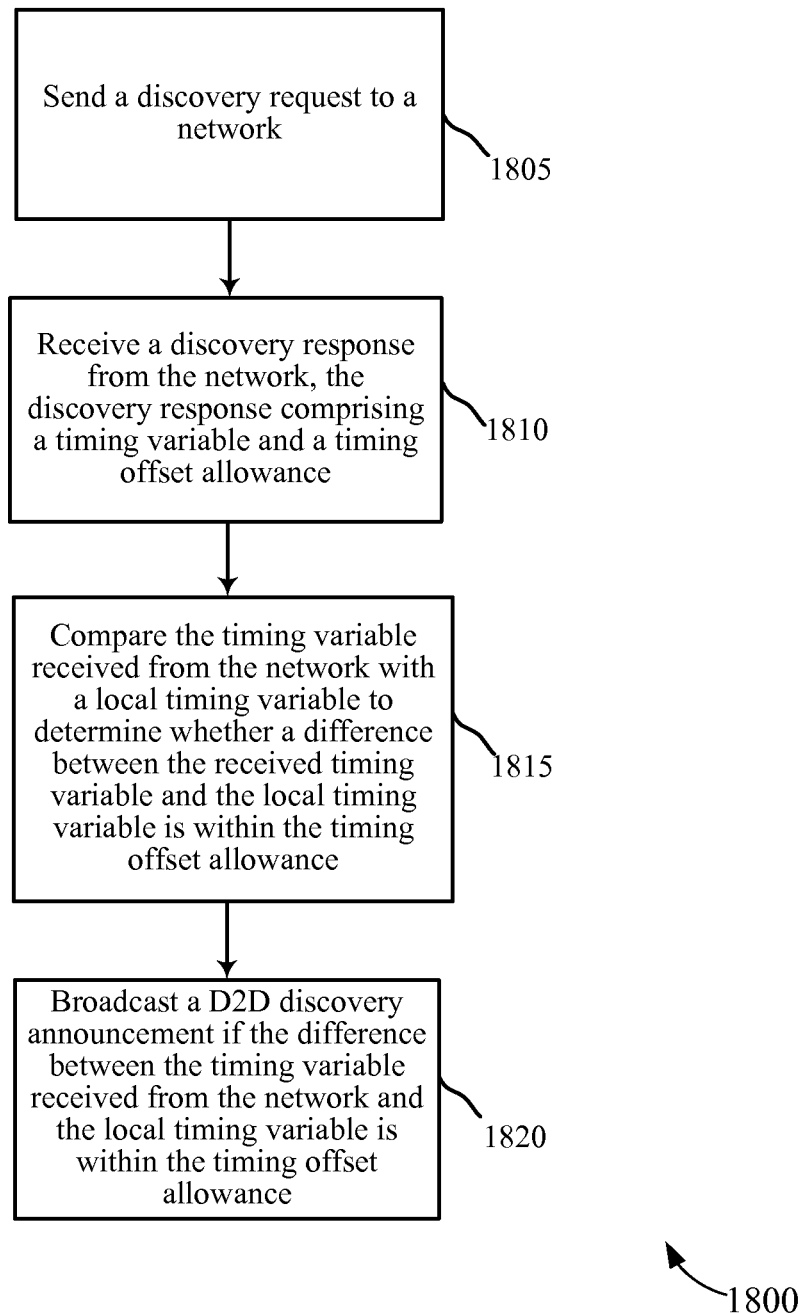
FIG. 18 shows a flow chart illustrating an example of a method for wireless communications, in accordance with various aspects of the present disclosure.

FIG. 18 is a flow chart illustrating an example of a method 1800 for wireless communication, in accordance with various aspects of the present disclosure. The method 1800 is described below with reference to aspects of one or more of the UEs 115 described with reference to FIGS. 1, 2, 3, 5, 6, and/or 9, respectively, or aspects of one or more of the apparatus 405 described with reference to FIG. 4.

At block 1805, the method 1800 includes sending a discovery request to a network to be allowed to announce a D2D discovery application code as described above with reference to FIG. 3. The discovery request may contain a ProSe application ID. The discovery request may be sent to a D2D discovery module such as a ProSe function in either PLMN or VPMLN serving the UE. The operation(s) of block 1805 may be performed by the D2D discovery module 415 in conjunction with the transmitter module 420 described above with reference to FIG. 4.

At block 1810, the method 1800 includes receiving a discovery response from the network as described above with reference to FIG. 3. The discovery response may include a timing variable and a timing offset allowance. The operation(s) of block 1810 may be performed by the D2D discovery module 415 in conjunction with the receiver module 410 described above with reference to FIG. 4.

At block 1815, the method 1800 includes comparing the timing variable received the network with a local timing variable at the device to determine whether a difference between the timing variable from the network and the local timing variable is within the timing offset received from the network, as described above with reference to FIG. 3. The operation(s) of block 1815 may be performed by the timing variable module 430 described above with reference to FIG. 4.

At block 1820, the method 1800 includes broadcasting a D2D discovery announcement if the difference between the timing variable received from the network and the local timing variable is within the timing offset allowance as described above with reference to FIG. 3. The operation(s) of block 1820 may be performed by the timing variable module 430 described above with reference to FIG. 4.

Figure 19:
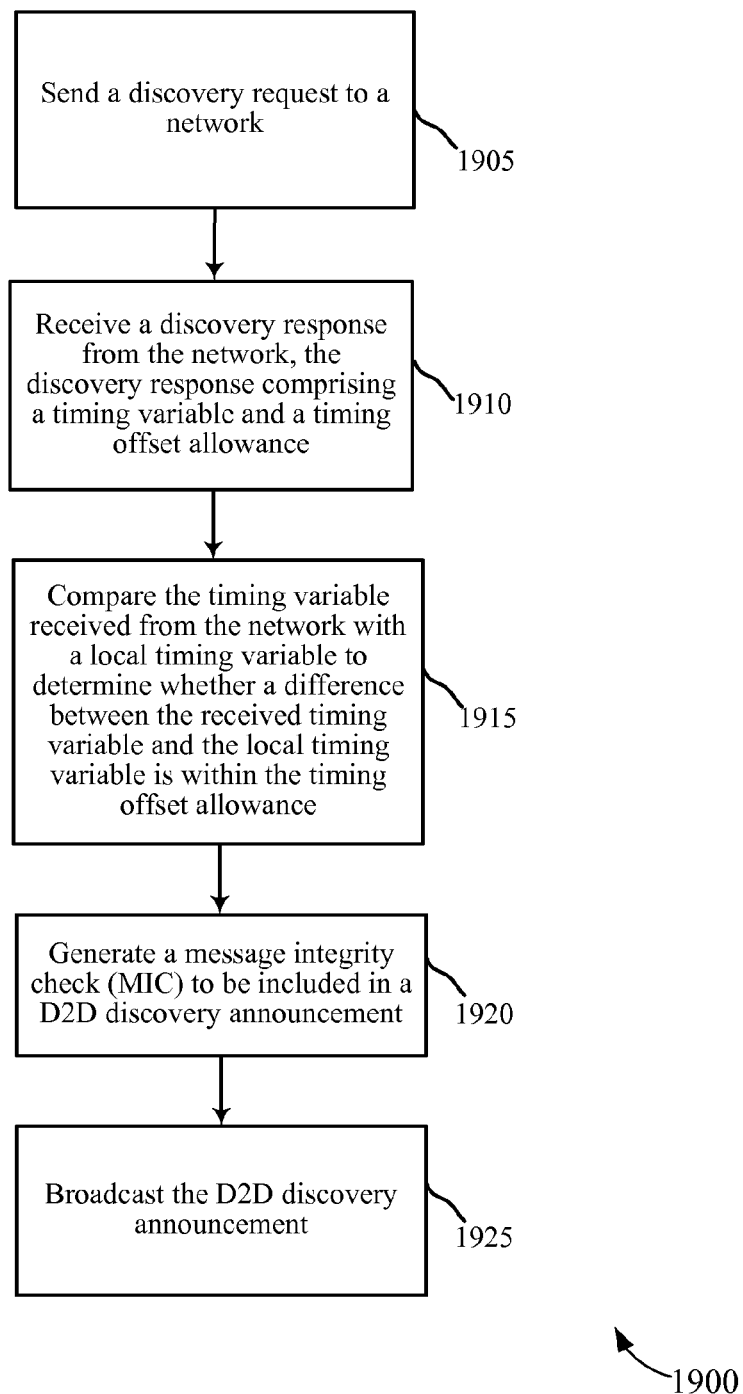
FIG. 19 shows a flow chart illustrating an example of a method for wireless communications, in accordance with various aspects of the present disclosure.

FIG. 19 is a flow chart illustrating an example of a method 1900 for wireless communication, in accordance with various aspects of the present disclosure. The method 1900 is described below with reference to aspects of one or more of the UEs 115 described with reference to FIGS. 1, 2, 3, 5, 6, and/or 9, respectively, or aspects of one or more of the apparatus 405 described with reference to FIG. 4.

At block 1905, the method 1900 includes sending a discovery request to a network to be allowed to announce a D2D discovery application code as described above with reference to FIG. 3. The discovery request may contain a ProSe application ID. The discovery request may be sent to a D2D discovery module such as ProSe function in PLMN or VPMLN serving the UE. The operation(s) of block 1905 may be performed by the D2D discovery module 415 in conjunction with the transmitter module 420 described above with reference to FIG. 4.

At block 1910, the method 1900 includes receiving a discovery response from the network as described above with reference to FIG. 3. The discovery response may include a timing variable and a timing offset allowance. The operation(s) of block 1910 may be performed by the D2D discovery module 415 in conjunction with the receiver module 410 described above with reference to FIG. 4.

At block 1915, the method 1900 includes comparing the timing variable received the network with a local timing variable at the device to determine whether a difference between the timing variable from the network and the local timing variable is within the timing offset received from the network, as described above with reference to FIG. 3. The operation(s) of block 1915 may be performed by the timing variable module 430 described above with reference to FIG. 4.

At block 1920, the method 1900 includes generating a MIC to be included in a D2D discovery announcement as described above with reference to FIG. 3. The operation(s) of block 1920 may be performed by the MIC module 425 described above with reference to FIG. 4.

At block 1925, the method 1900 includes broadcasting the D2D discovery announcement, if the difference between the timing variable received from the network and the local timing variable is within the timing offset allowance as described above with reference to FIG. 3. The D2D discovery code includes the MIC, as well as D2D discovery application code. The operation(s) of block 1925 may be performed by the timing variable module 430 in conjunction with the transmitter module 420 described above with reference to FIG. 4.

Figure 20:
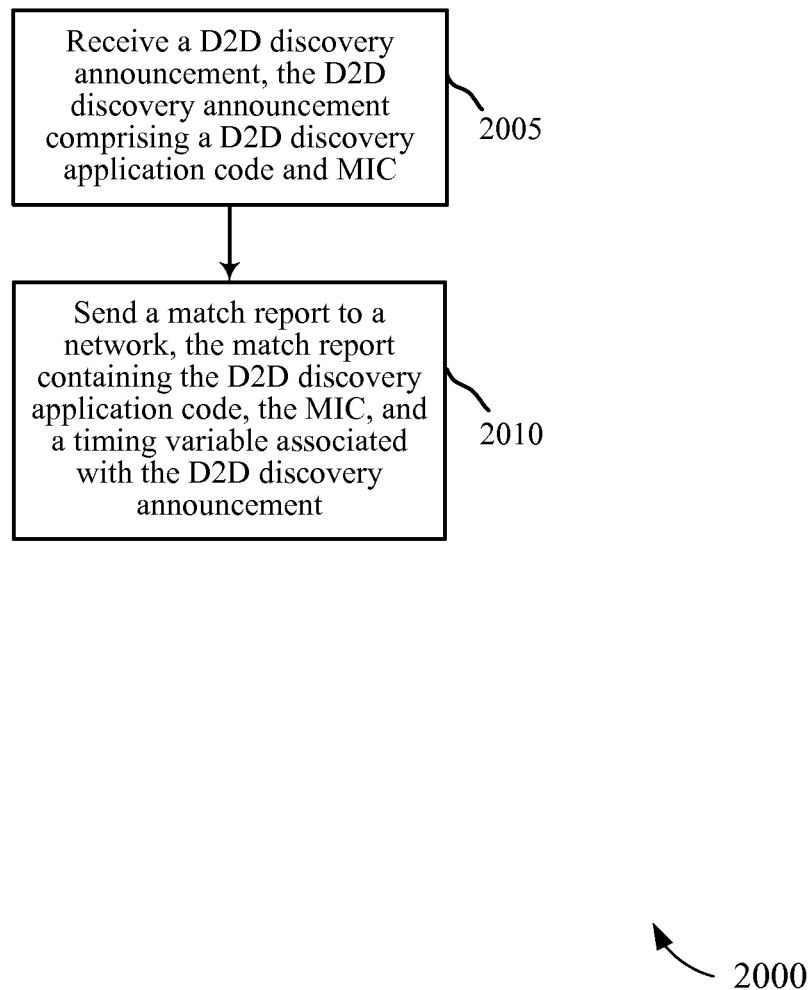
FIG. 20 shows a flow chart illustrating an example of a method for wireless communications, in accordance with various aspects of the present disclosure.

FIG. 20 is a flow chart illustrating an example of a method 2000 for wireless communication, in accordance with various aspects of the present disclosure. The method 2000 is described below with reference to aspects of one or more of the UEs 115 described with reference to FIGS. 1, 2, 3, 5, 6, and/or 9, respectively, or aspects of one or more of the apparatus 405 described with reference to FIG. 4.

At block 2005, the method 2000 includes receiving a D2D discovery announcement by a monitoring UE 115-c-2 as described above with reference to FIG. 3. The D2D discovery announcement may include a D2D discovery application code and MIC generated in an announcing UE 115-c-1 of FIG. 3. The operation(s) of block 2005 may be performed by the receiver module 410 described above with reference to FIG. 4.

At block 2010, the method 2000 includes sending a match report to a network for verification as described above with reference to FIG. 3. The match report may include the D2D discovery application code, MIC, and a timing variable. The operation(s) of block 2010 may be performed by the transmitter module 420 described above with reference to FIG. 4.

Figure 21:
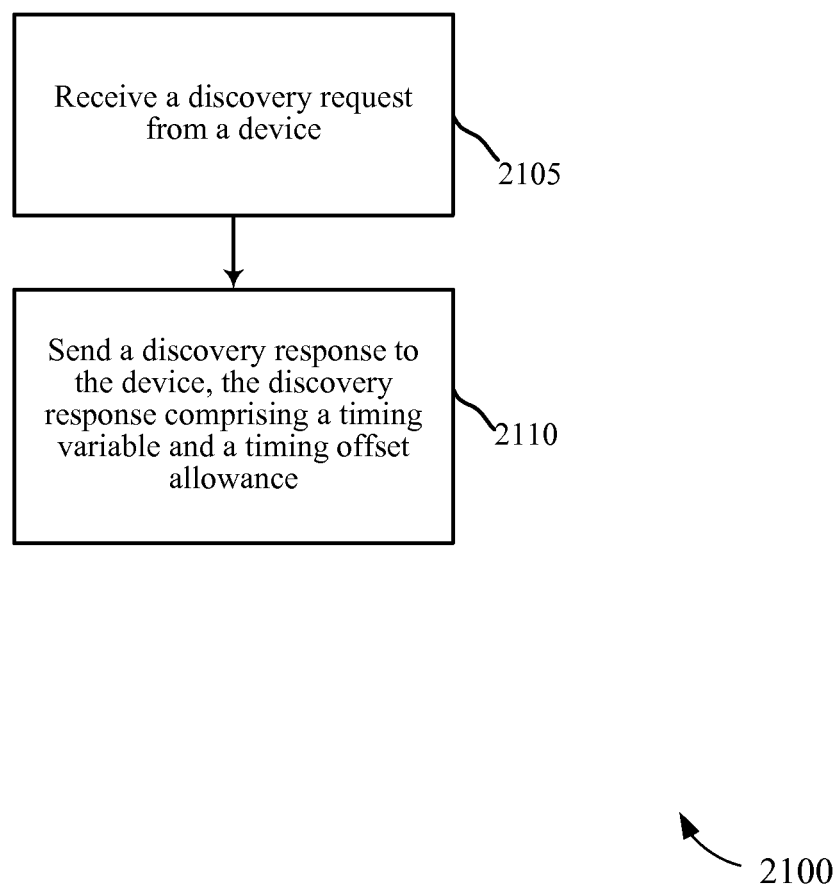
FIG. 21 shows a flow chart illustrating an example of a method for wireless communications, in accordance with various aspects of the present disclosure.

FIG. 21 is a flow chart illustrating an example of a method 2100 for wireless communication, in accordance with various aspects of the present disclosure. For clarity, the method 2100 is described below with reference to aspects of one or more of the base stations 105 and a core network 130 described with reference to FIGS. 1, 2, 5, 6, 7, 8, and/or 11, or aspects of one or more of the apparatus 1005 described with reference to FIG. 10. In some examples, a base station such as one of the base stations 105 or an apparatus such as the apparatus 1005 may execute one or more sets of codes to control the functional elements of the base station or apparatus to perform the functions described below.

At block 2105, the method 2100 may include receiving a discovery request from a device as described with reference to FIG. 3. The operation(s) of block 2105 may be performed by the receiver module 1010 described above with reference to FIG. 10.

At block 2110, the method 2100 may include sending a discovery response to the device as described with reference to FIG. 3. The discovery response may include a timing variable and a timing offset allowance. The operation(s) of block 2110 may be performed by the transmitter module 1020 described above with reference to FIG. 10.

Figure 22:
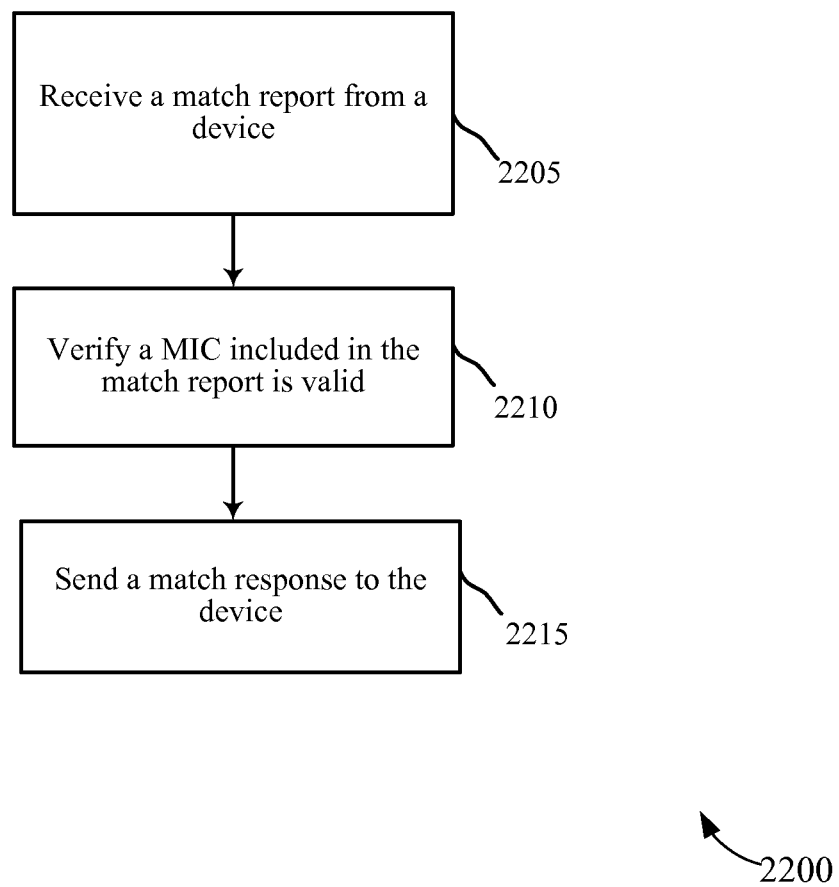
FIG. 22 shows a flow chart illustrating an example of a method for wireless communications, in accordance with various aspects of the present disclosure.

FIG. 22 is a flow chart illustrating an example of a method 2200 for wireless communication, in accordance with various aspects of the present disclosure. For clarity, the method 2200 is described below with reference to aspects of a network D2D discovery module 210 and/or 1015 described with reference to FIGS. 2, 3, 8, and/or 10. In some examples, an apparatus such as the apparatus 1005 may execute one or more sets of codes to control the functional elements of the base station or apparatus to perform the functions described below.

At block 2205, the method 2200 may include receiving a match report from a device as described with reference to FIG. 3. The match report may be received from a monitoring UE, and may contain a MIC and a timing variable as well as a D2D discovery application code. The operation(s) of block 2205 may be performed by the receiver module 1010 described above with reference to FIG. 10.

At block 2210, the method 2200 may include verifying that the MIC included in the match report is valid as described with reference to FIG. 3. The operation(s) of block 2210 may be performed by the D2D discovery module 210 and/or 1015 described above with reference to FIGS. 2, 3, 8, and/or 10.

At block 2215, the method 2200 may include sending a match response to the device as described with reference to FIG. 3. The match response may include a timing variable indicating a current time at the network and a ProSe Application ID. The operation(s) of block 2215 may be performed by the D2D discovery module 210 and/or 1015 in conjunction with the transmitter module 1020 described above with reference to FIG. 10.

It should be noted that the methods illustrated by flowcharts 1700, 1800, 1900, 2000, 2100, and 2200 are example implementations, and that the operations of the method, and the steps may be rearranged or otherwise modified such that other implementations are possible.

The detailed description set forth above in connection with the appended drawings describes examples and does not represent the only examples that may be implemented or that are within the scope of the claims. The term "example" and "exemplary," when used in this description mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

The communication networks that may accommodate some of the various disclosed examples may be packet-based networks that operate according to a layered protocol stack. For example, communications at the bearer or Packet Data Convergence Protocol (PDCP) layer may be IP-based.

A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid Automatic Repeat Request (HARM) to provide retransmission at the MAC layer to improve link efficiency. At the Physical layer, the transport channels may be mapped to Physical channels.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, a FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration. A processor may in some cases be in electronic communication with a memory, where the memory stores instructions that are executable by the processor.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items indicates a disjunctive list such that, for example, a list of "at least one of A, B, or C" means A or B or C or AB or AC or BC or ABC (i.e., A and B and C).

A computer program product or computer-readable medium both include a computer-readable storage medium and communication medium, including any mediums that facilitates transfer of a computer program from one place to another. A storage medium may be any medium that can be accessed by a general purpose or special purpose computer. By way of example, and not limitation, computer-readable medium can comprise RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote light source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method of wireless communication at a user equipment (UE), comprising:
   receiving a first time parameter and a timing offset allowance from a network, the first time parameter being received while the UE is in a connected mode;
   setting a timing variable based on the first time parameter;
   communicating a device-to-device (D2D) discovery message, the D2D discovery message being associated with D2D discovery communication with a second UE, the D2D discovery message identifying a second time parameter associated with a discovery slot for the D2D discovery communication;
   authenticating the D2D discovery message by comparing the second time parameter with the timing variable to determine whether a difference between the second time parameter and the timing variable is within the timing offset allowance; and
   communicating with the second UE according to one or more parameters in the D2D discovery message.

2. The method of claim 1, wherein the first time parameter is received from a proximity based service (ProSe) function in the network.

3. The method of claim 1, wherein the first time parameter is received with a D2D discovery application code.

4. The method of claim 2, further comprising:
   receiving the timing offset allowance from the ProSe function in the network.

5. The method of claim 4, further comprising:
   announcing a D2D discovery application code when the difference between the second time parameter and the timing variable is within the timing offset allowance.

6. The method of claim 4, further comprising:
   notifying the ProSe function of an anomaly when the difference is greater than the timing offset allowance.

7. The method of claim 4, wherein the first time parameter received from the network is coordinated universal time (UTC).

8. The method of claim 4, further comprising:
   receiving the second time parameter via a system information block (SIB).

9. The method of claim 1, further comprising:
sending a discovery request including a proximity based service (ProSe) application identification (ID) to the network.

10. The method of claim 9, further comprising:
receiving a discovery response from the network, the discovery response comprising the first time parameter and a timing offset allowance.

11. The method of claim 1, further comprising:
using the second time parameter to generate a message integrity code (MIC) to be included in a D2D discovery announcement.

12. The method of claim 11, wherein the MIC is generated based on a key associated with the D2D discovery application code and the second time parameter at a time of transmission of the D2D discovery announcement.

13. The method of claim 1, further comprising:
receiving a D2D discovery announcement message including a message integrity code (MIC); and
transmitting the received MIC and the second time parameter to a proximity based service (ProSe) function in the network.

14. The method of claim 8, further comprising:
ignoring the second time parameter received in the SIB if the UE detects more than one SIB having timing information; and
obtaining the second time parameter outside of the SIB.

15. The method of claim 8, further comprising:
comparing the second time parameter received in a system information block (SIB) with the timing variable; and
obtaining the second time parameter outside of the SIB if the second time parameter and the timing variable differ by more than a predetermined threshold.

16. The method of claim 1, further comprising:
requesting D2D discovery resources via a radio resource control (RRC) message when the UE is using a network controlled D2D discovery resource allocation scheme, wherein the first time parameter is received via a response to the RRC message.

17. The method of claim 1, further comprising:
receiving a radio resource control (RRC) message that includes the first time parameter and an empty resource allocation element.

18. The method of claim 4, further comprising:
synchronizing the second time parameter received from the ProSe function with the timing variable when the difference is less than the timing offset allowance.

19. The method of claim 13, further comprising:
transmitting a UTC-based timing variable with four least significant bits equal to four least significant bits received with the D2D discovery announcement message to a proximity based service (ProSe) function in the network.

20. An apparatus configured for wireless communication, comprising:
at least one processor; and
a memory coupled to the at least one processor, wherein the at least one processor is configured to:
receive a first time parameter and a timing offset allowance from a network at a user equipment (UE), the first time parameter being received while the UE is in a connected mode;
set a timing variable based on the first time parameter;
communicate a device-to-device (D2D) discovery message, the D2D discovery message being associated with D2D discovery communication with a second UE, the D2D discovery message identifying a second time parameter associated with a discovery slot for the D2D discovery communication;
authenticate the D2D discovery message by comparing the second time parameter with the timing variable to determine whether a difference between the second time parameter and the timing variable is within the timing offset allowance; and
communicate with the second UE according to one or more parameters in the D2D discovery message.

21. The apparatus of claim 20, wherein the first time parameter is received from a proximity based service (ProSe) function in the network.

22. The apparatus of claim 21, wherein the at least one processor is further configured to:
receive the timing offset allowance from the ProSe function in the network.

23. The apparatus of claim 22, wherein the at least one processor is further configured to:
announce a D2D discovery application code when the difference between the second time parameter and the timing variable is within the timing offset allowance.

24. The apparatus of claim 20, wherein the at least one processor is further configured to:
receive a D2D discovery announcement message including a message integrity code (MIC); and
transmit the received MIC, the second time parameter, and a UTC-based timing variable with four least significant bits equal to four least significant bits received with the D2D discovery announcement message to a proximity based service (ProSe) function in the network.

25. A method of wireless communication in a wireless network comprising:
entering into a connected mode with a user equipment (UE); and
transmitting a first time parameter and a timing offset allowance to the UE while the UE is in the connected mode for use in authentication of a device-to-device (D2D) discovery message associated with D2D discovery communication with a second UE, wherein the first time parameter is compared with a second time parameter to determine whether a difference between the first time parameter and the second time parameter is within the timing offset allowance.

26. The method of claim 25, wherein the first time parameter is transmitted from a proximity based service (ProSe) function.

27. The method of claim 25, further comprising:
transmitting the first time parameter with a D2D discovery application code.

28. The method of claim 25, further comprising:
receiving a discovery request including a proximity based service (ProSe) application identification (ID) from the UE; and
sending a discovery response to the UE, the discovery response comprising the first time parameter and a timing offset allowance.

29. The method of claim 25, further comprising:
receiving a radio resource control (RRC) request for discovery resources, wherein transmitting the first time parameter comprises transmitting a response to the RRC request that includes the first time parameter.

30. An apparatus configured for wireless communication, comprising:
- at least one processor; and
- a memory coupled to the at least one processor, wherein the at least one processor is configured to:
- enter into a connected mode with a user equipment (UE); and
- transmit a first time parameter and a timing offset allowance to the UE while the UE is in the connected mode for use in authentication of a device-to-device (D2D) discovery message associated with D2D discovery communication with a second UE, wherein the first time parameter is compared with a second time parameter to determine whether a difference between the first time parameter and the second time parameter is within the timing offset allowance.

* * * * *